(12) United States Patent
Thomassy et al.

(10) Patent No.: US 9,611,921 B2
(45) Date of Patent: Apr. 4, 2017

(54) INFINITELY VARIABLE TRANSMISSIONS, CONTINUOUSLY VARIABLE TRANSMISSIONS, METHODS, ASSEMBLIES, SUBASSEMBLIES, AND COMPONENTS THEREFOR

(71) Applicant: Fallbrook Intellectual Property Company LLC, Cedar Park, TX (US)

(72) Inventors: Fernand A. Thomassy, Liberty Hill, TX (US); Robert Smithson, Cedar Park, TX (US); David Brian Jackson, Cedar Park, TX (US); Charles B. Lohr, III, Austin, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 297 days.

(21) Appl. No.: 14/337,486

(22) Filed: Jul. 22, 2014

(65) Prior Publication Data

US 2014/0329637 A1    Nov. 6, 2014

Related U.S. Application Data

(63) Continuation of application No. PCT/US2013/022419, filed on Jan. 21, 2013.
(Continued)

(51) Int. Cl.
*F16H 15/40* (2006.01)
*F16H 15/52* (2006.01)

(52) U.S. Cl.
CPC ............. *F16H 15/40* (2013.01); *F16H 15/52* (2013.01)

(58) Field of Classification Search
CPC ................................ F16H 15/40; F16H 15/52
See application file for complete search history.

(56) References Cited

U.S. PATENT DOCUMENTS

| 719,595 | A | 2/1903 | Huss |
| 1,121,210 | A | 12/1914 | Techel |

(Continued)

FOREIGN PATENT DOCUMENTS

| CH | 118064 | 12/1926 |
| CN | 1054340 | 9/1991 |

(Continued)

OTHER PUBLICATIONS

International Search Report and Written Opinion dated Mar. 29, 2013 for PCT Application No. PCT/US13/22419.
(Continued)

*Primary Examiner* — David M Fenstermacher
(74) *Attorney, Agent, or Firm* — Knobbe Martens Olson & Bear LLP

(57) ABSTRACT

Inventive embodiments are directed to components, subassemblies, systems, and/or methods for infinitely variable transmissions (IVT). In one embodiment, a control system is adapted to facilitate a change in operating mode of an IVT. In another embodiment, a control system includes a drive clutch coupled to a source of rotational power; the drive clutch is configured to selectively engage a traction ring and a carrier of the IVT. The control system includes a one-way clutch assembly configured to selectively engage the traction ring and the carrier. In some embodiments, the control system governs the actuation of the one-way clutch to selectively lock and unlock components of the IVT. In some embodiments, the control system implements an IVT mode wherein the carrier selectively couples to a source of rotational power. In other embodiments, the control system implements a CVT mode wherein the traction ring selectively couples to a source of rotational power.

17 Claims, 18 Drawing Sheets

Related U.S. Application Data

(60) Provisional application No. 61/589,765, filed on Jan. 23, 2012.

(56) References Cited

U.S. PATENT DOCUMENTS

| | | |
|---|---|---|
| 1,175,677 A | 3/1916 | Barnes |
| 1,207,985 A | 12/1916 | Null et al. |
| 1,380,006 A | 5/1921 | Nielson |
| 1,390,971 A | 9/1921 | Samain |
| 1,558,222 A | 10/1925 | Beetow |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,586,725 A | 2/1952 | Henry |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson et al. |
| 2,868,038 A | 5/1955 | Billeter |
| 2,716,357 A | 8/1955 | Rennerfelt |
| 2,730,904 A | 1/1956 | Rennerfelt |
| 2,748,614 A | 6/1956 | Weisel |
| 2,959,070 A | 1/1959 | Flinn |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,901,924 A | 9/1959 | Banker |
| 2,913,932 A | 11/1959 | Oehrli |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,209,606 A | 10/1965 | Yamamoto |
| 3,211,364 A | 10/1965 | Wentling et al. |
| 3,216,283 A | 11/1965 | General |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,283,614 A | 11/1966 | Hewko |
| 3,292,443 A | 12/1966 | Felix |
| 3,340,895 A | 9/1967 | Osgood, Jr. et al. |
| 3,407,687 A | 10/1968 | Hayashi |
| 3,439,563 A | 4/1969 | Petty |
| 3,440,895 A | 4/1969 | Fellows |
| 3,464,281 A | 9/1969 | Hiroshi et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,987,681 A | 10/1976 | Keithley et al. |
| 3,996,807 A | 12/1976 | Adams |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,501,172 A | 2/1985 | Kraus |
| 4,526,255 A | 7/1985 | Hennessey et al. |
| 4,546,673 A | 10/1985 | Shigematsu et al. |
| 4,560,369 A | 12/1985 | Hattori |
| 4,567,781 A | 2/1986 | Russ |
| 4,572,015 A * | 2/1986 | Kemper ............... F16H 15/50 475/166 |
| 4,574,649 A | 3/1986 | Seol |
| 4,585,429 A | 4/1986 | Marier |
| 4,617,838 A | 10/1986 | Anderson |
| 4,630,839 A | 12/1986 | Seol |
| 4,631,469 A | 12/1986 | Tsuboi et al. |
| 4,651,082 A | 3/1987 | Kaneyuki |
| 4,663,990 A | 5/1987 | Itoh et al. |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A | 4/1991 | Itoh et al. |
| 5,020,384 A | 6/1991 | Kraus |
| 5,025,685 A | 6/1991 | Kobayashi et al. |
| 5,033,322 A | 7/1991 | Nakano |
| 5,033,571 A | 7/1991 | Morimoto |

(56) References Cited

U.S. PATENT DOCUMENTS

| | | |
|---|---|---|
| 5,037,361 A | 8/1991 | Takahashi |
| 5,044,214 A | 9/1991 | Barber |
| 5,059,158 A | 10/1991 | Bellio et al. |
| 5,069,655 A | 12/1991 | Schievelbusch |
| 5,099,710 A | 3/1992 | Nakano |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,845 A | 9/1997 | Muramoto et al. |
| 5,690,346 A | 11/1997 | Keskitalo |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,899,827 A | 5/1999 | Nakano et al. |
| 5,902,207 A | 5/1999 | Sugihara |
| 5,967,933 A | 10/1999 | Valdenaire |
| 5,984,826 A | 11/1999 | Nakano |
| 5,995,895 A | 11/1999 | Watt et al. |
| 6,000,707 A | 12/1999 | Miller |
| 6,004,239 A | 12/1999 | Makino |
| 6,006,151 A | 12/1999 | Graf |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A | 4/2000 | Kolde et al. |
| 6,054,844 A | 4/2000 | Frank |
| 6,066,067 A | 5/2000 | Greenwood |
| 6,071,210 A | 6/2000 | Kato |
| 6,076,846 A | 6/2000 | Clardy |
| 6,079,726 A | 6/2000 | Busby |
| 6,086,506 A | 7/2000 | Petersmann et al. |
| 6,095,940 A | 8/2000 | Ai et al. |
| 6,099,431 A | 8/2000 | Hoge et al. |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidan |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,217,473 B1 | 4/2001 | Ueda et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,358,174 B1 | 3/2002 | Folsom et al. |
| 6,358,178 B1 | 3/2002 | Wittkopp |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,037 B2 | 8/2002 | Takagi et al. |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,532,890 B2 | 3/2003 | Chen |
| 6,551,210 B2 | 4/2003 | Miller |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,721,637 B2 | 4/2004 | Abe et al. |
| 6,723,016 B2 | 4/2004 | Sumi |
| 6,805,654 B2 | 10/2004 | Nishii |
| 6,808,053 B2 | 10/2004 | Kirkwood et al. |
| 6,839,617 B2 | 1/2005 | Mensler et al. |
| 6,849,020 B2 | 2/2005 | Sumi |
| 6,859,709 B2 | 2/2005 | Joe et al. |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |

(56) References Cited

U.S. PATENT DOCUMENTS

| | | |
|---|---|---|
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,478,885 B2 | 1/2009 | Urabe |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petrzik et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,106 B2 | 6/2010 | Maheu et al. |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,770,674 B2 | 8/2010 | Miles et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,723 B2 | 3/2011 | Triller et al. |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,230,961 B2 | 7/2012 | Schneidewind |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,889 B2 | 2/2013 | Hoffman et al. |
| 8,376,903 B2 | 2/2013 | Pohl et al. |
| 8,382,631 B2 | 2/2013 | Hoffman et al. |
| 8,382,637 B2 | 2/2013 | Tange |
| 8,393,989 B2 | 3/2013 | Pohl |
| 8,398,518 B2 | 3/2013 | Nichols et al. |
| 8,469,853 B2 | 6/2013 | Miller et al. |
| 8,469,856 B2 | 6/2013 | Thomassy |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,512,195 B2 | 8/2013 | Lohr et al. |
| 8,535,199 B2 | 9/2013 | Lohr et al. |
| 8,550,949 B2 | 10/2013 | Miller |
| 8,585,528 B2 | 11/2013 | Carter et al. |
| 8,608,609 B2 * | 12/2013 | Sherrill ............ F02D 41/0007 475/159 |
| 8,622,866 B2 | 1/2014 | Bazyn et al. |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,663,050 B2 | 3/2014 | Nichols et al. |
| 8,678,974 B2 | 3/2014 | Lohr |
| 8,708,360 B2 | 4/2014 | Miller et al. |
| 8,721,485 B2 | 5/2014 | Lohr et al. |
| 8,738,255 B2 | 5/2014 | Carter et al. |
| 8,776,633 B2 | 7/2014 | Armstrong et al. |
| 8,784,248 B2 | 7/2014 | Murakami et al. |
| 8,790,214 B2 | 7/2014 | Lohr et al. |
| 8,818,661 B2 | 8/2014 | Keilers et al. |
| 8,888,643 B2 | 11/2014 | Lohr et al. |
| 8,996,263 B2 | 3/2015 | Quinn et al. |
| 2001/0008192 A1 | 7/2001 | Morisawa |
| 2001/0041644 A1 | 11/2001 | Yasuoka et al. |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0037786 A1 | 3/2002 | Hirano et al. |

(56) References Cited

U.S. PATENT DOCUMENTS

| | | |
|---|---|---|
| 2002/0045511 A1 | 4/2002 | Geiberger et al. |
| 2002/0128107 A1 | 9/2002 | Wakayama |
| 2002/0169051 A1 | 11/2002 | Oshidari |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0132051 A1 | 7/2003 | Nishii et al. |
| 2003/0135316 A1 | 7/2003 | Kawamura et al. |
| 2003/0160420 A1 | 8/2003 | Fukuda |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0058772 A1 | 3/2004 | Inoue et al. |
| 2004/0067816 A1 | 4/2004 | Taketsuna et al. |
| 2004/0082421 A1 | 4/2004 | Wafzig |
| 2004/0092359 A1 | 5/2004 | Imanishi et al. |
| 2004/0119345 A1 | 6/2004 | Takano |
| 2004/0171457 A1 | 9/2004 | Fuller |
| 2004/0204283 A1 | 10/2004 | Inoue |
| 2004/0231331 A1 | 11/2004 | Iwanami et al. |
| 2004/0254047 A1 | 12/2004 | Frank et al. |
| 2005/0037876 A1 | 2/2005 | Unno et al. |
| 2005/0085979 A1 | 4/2005 | Carlson et al. |
| 2005/0184580 A1 | 8/2005 | Kuan et al. |
| 2005/0227809 A1 | 10/2005 | Bitzer et al. |
| 2006/0000684 A1* | 1/2006 | Agner .................... F16D 13/72 192/48.8 |
| 2006/0006008 A1 | 1/2006 | Brunemann et al. |
| 2006/0052204 A1 | 3/2006 | Eckert et al. |
| 2006/0108956 A1 | 5/2006 | Clark |
| 2006/0111212 A9 | 5/2006 | Ai et al. |
| 2006/0154775 A1 | 7/2006 | Ali et al. |
| 2006/0172829 A1 | 8/2006 | Ishio |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0234826 A1* | 10/2006 | Moehlmann ............ F16H 61/12 476/10 |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0099753 A1 | 5/2007 | Matsui et al. |
| 2007/0149342 A1 | 6/2007 | Guenter et al. |
| 2007/0155567 A1 | 7/2007 | Miller et al. |
| 2007/0155580 A1 | 7/2007 | Nichols et al. |
| 2007/0193391 A1 | 8/2007 | Armstrong et al. |
| 2007/0228687 A1 | 10/2007 | Parker |
| 2007/0270271 A1 | 11/2007 | Miller et al. |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039276 A1 | 2/2008 | Smithson et al. |
| 2008/0081728 A1 | 4/2008 | Faulring et al. |
| 2008/0139363 A1 | 6/2008 | Williams |
| 2008/0149407 A1 | 6/2008 | Shibata et al. |
| 2008/0200300 A1 | 8/2008 | Smithson et al. |
| 2008/0228362 A1 | 9/2008 | Muller et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |
| 2009/0251013 A1 | 10/2009 | Vollmer et al. |
| 2010/0056322 A1 | 3/2010 | Thomassy |
| 2010/0093476 A1 | 4/2010 | Carter et al. |
| 2010/0093479 A1 | 4/2010 | Carter et al. |
| 2010/0267510 A1 | 10/2010 | Nichols et al. |
| 2011/0088503 A1 | 4/2011 | Armstrong et al. |
| 2011/0127096 A1 | 6/2011 | Schneidewind |
| 2011/0184614 A1 | 7/2011 | Keilers et al. |
| 2011/0230297 A1 | 9/2011 | Shiina et al. |
| 2011/0237385 A1* | 9/2011 | Andre Parise .......... F16H 15/12 476/56 |
| 2011/0291507 A1 | 12/2011 | Post |
| 2011/0319222 A1 | 12/2011 | Ogawa et al. |
| 2012/0035015 A1 | 2/2012 | Ogawa et al. |
| 2012/0258839 A1 | 10/2012 | Smithson et al. |
| 2013/0035200 A1 | 2/2013 | Noji et al. |
| 2013/0053211 A1 | 2/2013 | Fukuda et al. |
| 2013/0095977 A1 | 4/2013 | Smithson et al. |
| 2013/0146406 A1 | 6/2013 | Nichols et al. |
| 2013/0152715 A1 | 6/2013 | Pohl et al. |
| 2013/0190123 A1 | 7/2013 | Pohl et al. |
| 2013/0288844 A1 | 10/2013 | Thomassy |
| 2013/0288848 A1 | 10/2013 | Carter et al. |
| 2013/0310214 A1 | 11/2013 | Pohl et al. |
| 2013/0324344 A1 | 12/2013 | Pohl et al. |
| 2013/0337971 A1 | 12/2013 | Kolstrup |
| 2014/0011619 A1 | 1/2014 | Pohl et al. |
| 2014/0011628 A1 | 1/2014 | Lohr et al. |
| 2014/0038771 A1 | 2/2014 | Miller |
| 2014/0073470 A1 | 3/2014 | Carter et al. |
| 2014/0121922 A1 | 5/2014 | Vasiliotis et al. |
| 2014/0128195 A1 | 5/2014 | Miller et al. |
| 2014/0141919 A1 | 5/2014 | Bazyn et al. |
| 2014/0144260 A1 | 5/2014 | Nichols et al. |
| 2014/0148303 A1 | 5/2014 | Nichols et al. |
| 2014/0179479 A1 | 6/2014 | Nichols et al. |
| 2014/0206499 A1 | 7/2014 | Lohr |
| 2014/0248988 A1 | 9/2014 | Lohr et al. |
| 2014/0257650 A1 | 9/2014 | Carter et al. |
| 2014/0323260 A1 | 10/2014 | Miller et al. |
| 2014/0329637 A1* | 11/2014 | Thomassy ............... F16H 15/40 476/38 |
| 2014/0335991 A1 | 11/2014 | Lohr et al. |
| 2014/0365059 A1 | 12/2014 | Keilers et al. |
| 2015/0018154 A1 | 1/2015 | Thomassy |
| 2015/0039195 A1 | 2/2015 | Pohl et al. |
| 2015/0051801 A1 | 2/2015 | Quinn et al. |
| 2015/0072827 A1 | 3/2015 | Lohr et al. |
| 2015/0080165 A1 | 3/2015 | Pohl et al. |
| 2015/0226323 A1 | 8/2015 | Pohl et al. |
| 2015/0233473 A1 | 8/2015 | Miller et al. |
| 2015/0260284 A1 | 9/2015 | Miller et al. |
| 2015/0337928 A1 | 11/2015 | Smithson |

FOREIGN PATENT DOCUMENTS

| | | |
|---|---|---|
| CN | 2245830 | 1/1997 |
| CN | 1157379 | 8/1997 |
| CN | 1167221 | 12/1997 |
| CN | 1204991 | 1/1999 |
| CN | 1283258 | 2/2001 |
| CN | 1300355 | 6/2001 |
| CN | 1474917 | 2/2004 |
| CN | 1654858 | 8/2005 |
| CN | 2714896 | 8/2005 |
| CN | 1860315 | 11/2006 |
| CN | 1940348 | 4/2007 |
| DE | 498 701 | 5/1930 |
| DE | 1171692 | 6/1964 |
| DE | 2 310880 | 9/1974 |
| DE | 2 136 243 | 1/1975 |
| DE | 2436496 | 2/1975 |
| DE | 39 40 919 A1 | 6/1991 |
| DE | 19851738 | 5/2000 |
| DE | 10155392 | 5/2003 |
| EP | 0 432 742 | 12/1990 |
| EP | 0 528 381 | 2/1993 |
| EP | 0 528 382 | 2/1993 |
| EP | 0 635 639 | 1/1995 |
| EP | 0 638 741 | 2/1995 |
| EP | 0 831 249 | 3/1998 |
| EP | 0 832 816 | 4/1998 |
| EP | 0 976 956 | 2/2000 |
| EP | 1 136 724 | 9/2001 |
| EP | 1 366 978 | 3/2003 |
| EP | 1 433 641 | 6/2004 |
| EP | 1 624 230 | 2/2006 |
| FR | 620375 | 4/1927 |
| FR | 2460427 | 1/1981 |
| FR | 2590638 | 5/1987 |

(56) References Cited

FOREIGN PATENT DOCUMENTS

| | | |
|---|---|---|
| GB | 391448 | 4/1933 |
| GB | 592320 | 9/1947 |
| GB | 906002 | 9/1962 |
| GB | 919430 | 2/1963 |
| GB | 1132473 | 11/1968 |
| GB | 1165545 | 10/1969 |
| GB | 1376057 | 12/1974 |
| GB | 2031822 | 4/1980 |
| GB | 2035482 | 6/1980 |
| GB | 2080452 | 8/1982 |
| JP | 38-025315 | 11/1963 |
| JP | 41-3126 | 2/1966 |
| JP | 42-2843 | 2/1967 |
| JP | 42-2844 | 2/1967 |
| JP | 44-1098 | 1/1969 |
| JP | 47-207 | 6/1972 |
| JP | 47-20535 | 6/1972 |
| JP | 47-000448 | 7/1972 |
| JP | 47-29762 | 11/1972 |
| JP | 48-54371 | 7/1973 |
| JP | 49-12742 | 3/1974 |
| JP | 49-013823 | 4/1974 |
| JP | 49-041536 | 11/1974 |
| JP | 50-114581 | 9/1975 |
| JP | 51-25903 | 8/1976 |
| JP | 51-150380 | 12/1976 |
| JP | 52-35481 | 3/1977 |
| JP | 53-048166 | 1/1978 |
| JP | 55-135259 | 10/1980 |
| JP | 56-047231 | 4/1981 |
| JP | 56-127852 | 10/1981 |
| JP | 58-065361 | 4/1983 |
| JP | 59-069565 | 4/1984 |
| JP | 59-144826 | 8/1984 |
| JP | 59-190557 | 10/1984 |
| JP | 60-247011 | 12/1985 |
| JP | 61-031754 | 2/1986 |
| JP | 61-053423 | 3/1986 |
| JP | 61-144466 | 7/1986 |
| JP | 61-173722 | 10/1986 |
| JP | 61-270552 | 11/1986 |
| JP | 62-075170 | 4/1987 |
| JP | 63-219953 | 9/1988 |
| JP | 63-160465 | 10/1988 |
| JP | 01-286750 | 11/1989 |
| JP | 01-308142 | 12/1989 |
| JP | 02-130224 | 5/1990 |
| JP | 02-157483 | 6/1990 |
| JP | 02-271142 | 6/1990 |
| JP | 02-182593 | 7/1990 |
| JP | 03-149442 | 6/1991 |
| JP | 03-223555 | 10/1991 |
| JP | 04-166619 | 6/1992 |
| JP | 04-272553 | 9/1992 |
| JP | 04-327055 | 11/1992 |
| JP | 04-351361 | 12/1992 |
| JP | 05-087154 | 4/1993 |
| JP | 06-050169 | 2/1994 |
| JP | 6-50358 | 2/1994 |
| JP | 07-42799 | 2/1995 |
| JP | 07-133857 | 5/1995 |
| JP | 07-139600 | 5/1995 |
| JP | 07-259950 | 10/1995 |
| JP | 08-170706 | 7/1996 |
| JP | 08-247245 | 9/1996 |
| JP | 08-270772 | 10/1996 |
| JP | 09-024743 | 1/1997 |
| JP | 09-089064 | 3/1997 |
| JP | 10-061739 | 3/1998 |
| JP | 10-089435 | 4/1998 |
| JP | 10-115355 | 5/1998 |
| JP | 10-115356 | 5/1998 |
| JP | 10-194186 | 7/1998 |
| JP | 10-511621 | 11/1998 |
| JP | 11-063130 | 3/1999 |
| JP | 11-091411 | 4/1999 |
| JP | 11-257479 | 9/1999 |
| JP | 2000-46135 | 2/2000 |
| JP | 2000-177673 | 6/2000 |
| JP | 2001-027298 | 1/2001 |
| JP | 2001-071986 | 3/2001 |
| JP | 2001-107827 | 4/2001 |
| JP | 2001-165296 | 6/2001 |
| JP | 2001-328466 | 11/2001 |
| JP | 2002-147558 | 5/2002 |
| JP | 2002-250421 | 6/2002 |
| JP | 2002-307956 | 10/2002 |
| JP | 2002-533626 | 10/2002 |
| JP | 2002-372114 | 12/2002 |
| JP | 2003-028257 | 1/2003 |
| JP | 2003-56662 | 2/2003 |
| JP | 2003-161357 | 6/2003 |
| JP | 2003 194206 | 7/2003 |
| JP | 2003-194207 | 7/2003 |
| JP | 2003-336732 | 11/2003 |
| JP | 2004-011834 | 1/2004 |
| JP | 2004-162652 | 6/2004 |
| JP | 2004-189222 | 7/2004 |
| JP | 2004-526917 | 9/2004 |
| JP | 2005-003063 | 1/2005 |
| JP | 2005-240928 | 9/2005 |
| JP | 2005-312121 | 11/2005 |
| JP | 2006-015025 | 1/2006 |
| JP | 2006-283900 | 10/2006 |
| JP | 2006-300241 | 11/2006 |
| JP | 2008-002687 | 1/2008 |
| JP | 2010-069005 | 4/2010 |
| JP | 2010-144932 | 7/2010 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 275872 | 5/1996 |
| TW | 360184 | 6/1999 |
| TW | 366396 | 8/1999 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | M294598 | 7/2006 |
| TW | 200637745 | 11/2006 |
| WO | WO 99/20918 | 4/1999 |
| WO | WO 01/73319 | 10/2001 |
| WO | WO 03/100294 | 12/2003 |
| WO | WO 2005/083305 | 9/2005 |
| WO | WO 2005/108825 | 11/2005 |
| WO | WO 2005/111472 | 11/2005 |
| WO | WO 2006/091503 | 8/2006 |
| WO | WO 2008/078047 | 7/2008 |
| WO | WO 2008/100792 | 8/2008 |
| WO | WO 2010/017242 | 2/2010 |
| WO | WO 2010/135407 | 11/2010 |
| WO | WO 2011/101991 | 8/2011 |
| WO | WO 2012/030213 | 3/2012 |
| WO | WO 2013/112408 | 8/2013 |

OTHER PUBLICATIONS

Decision to Grant a Patent dated Jan. 19, 2017 in Chinese Patent Application No. 201380013396.7.

\* cited by examiner

| Clutch | IVP Mode | CVP Mode | Coupling Component |
|--------|----------|----------|--------------------|
| C1 | X | O | CARRIER MEMBER |
| C2 | O | X | RING |
| C3 | X | O | RING |
| C4 | O | X | CARRIER MEMBER |

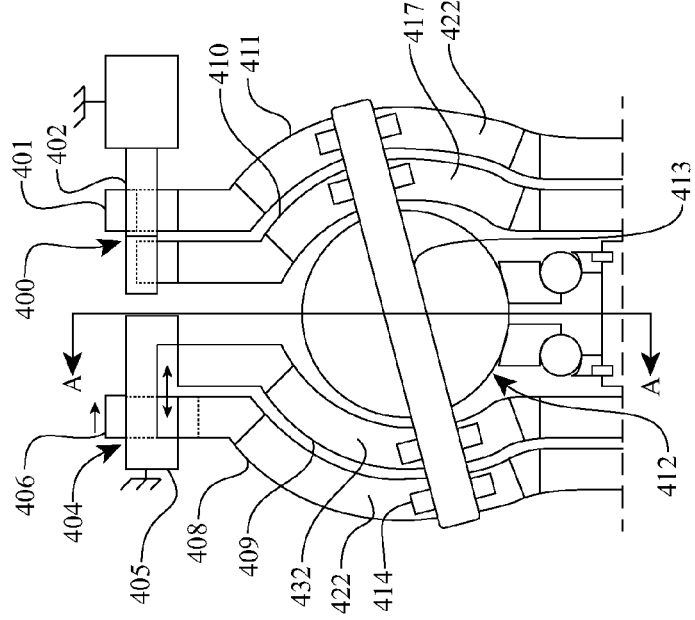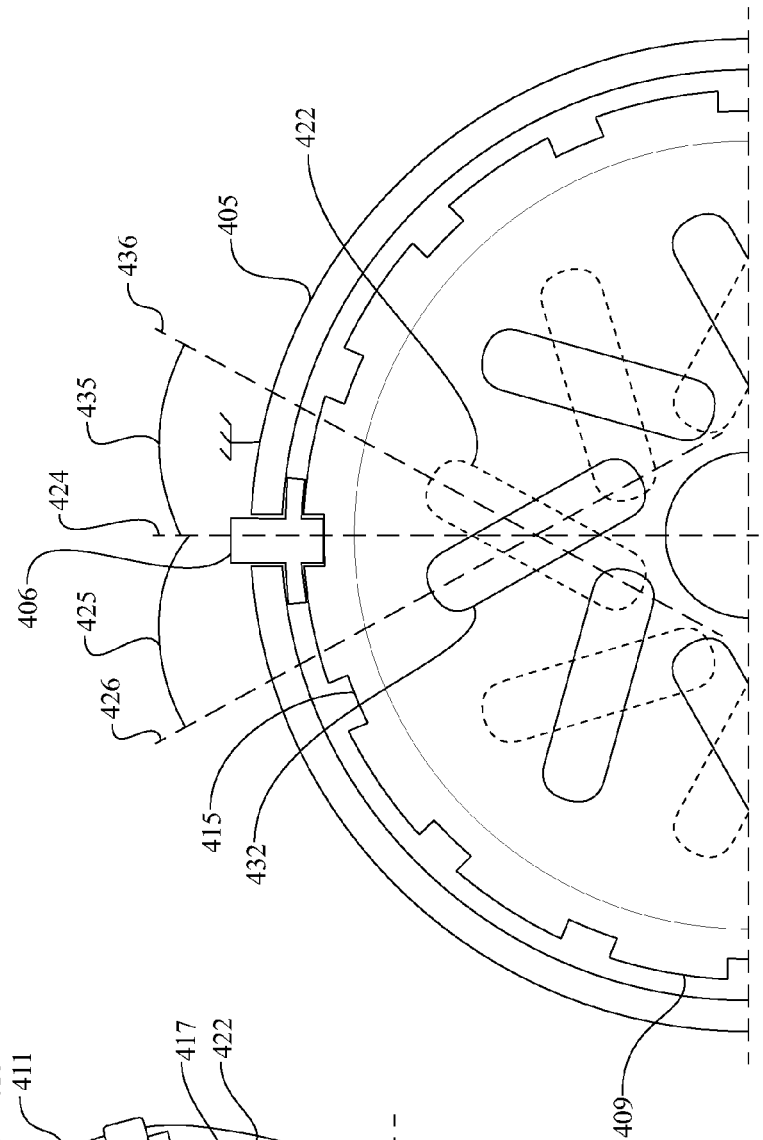

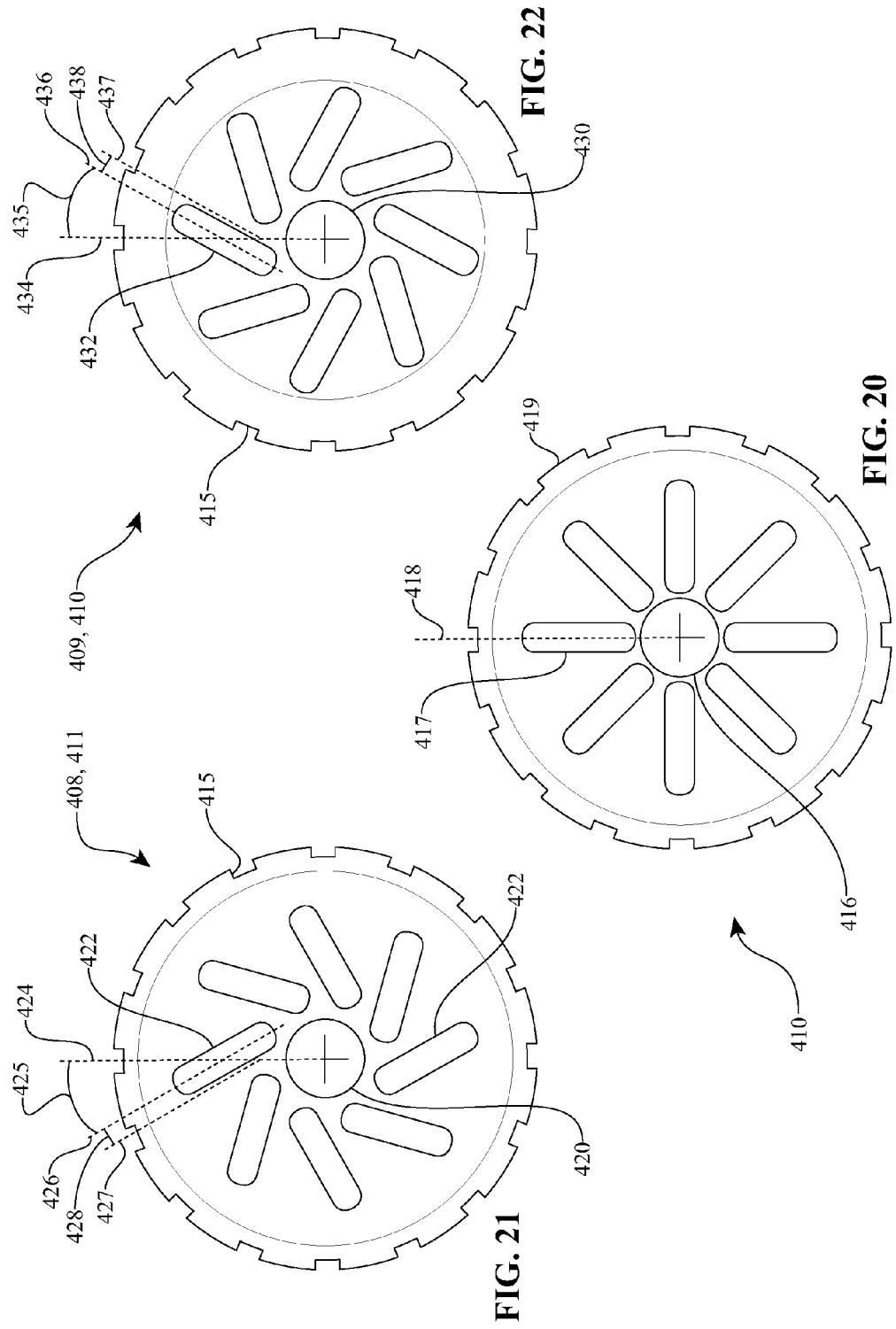

INFINITELY VARIABLE TRANSMISSIONS, CONTINUOUSLY VARIABLE TRANSMISSIONS, METHODS, ASSEMBLIES, SUBASSEMBLIES, AND COMPONENTS THEREFOR

CROSS REFERENCE TO RELATED APPLICATIONS

This application is a continuation of International Application No. PCT/US2013/022419, filed Jan. 21, 2013, which claims the benefit of U.S. Provisional Patent Application No. 61/589,765, filed on Jan. 23, 2012. The disclosures of all of the above-referenced prior applications, publications, and patents are considered part of the disclosure of this application, and are incorporated by reference herein in their entirety.

BACKGROUND OF THE INVENTION

1. Field of the Invention

This disclosure relates generally to transmissions, and more particularly the embodiments related to continuously variable transmissions (CVTs) and infinitely variable transmissions (IVTs).

2. Description of the Related Art

In certain systems, power is characterized by torque and rotational speed. More specifically, power in these systems is generally defined as the product of torque and rotational speed. Typically, a transmission couples to a power input that provides an input torque at an input speed. The transmission also couples to a load that demands an output torque and output speed, which may differ from the input torque and the input speed. Typically, and generalizing, a prime mover provides the power input to the transmission, and a driven device or load receives the power output from the transmission. A primary function of the transmission is to modulate the power input in such a way to deliver a power output to the driven device at a desired ratio of input speed to output speed ("speed ratio").

Some mechanical drives include transmissions of the type known as stepped, discrete, or fixed ratio. These transmissions are configured to provide speed ratios that are discrete or stepped in a given speed ratio range. For example, such a transmission may provide for a speed ratio of 1:2, 1:1, or 2:1, but such a transmission cannot deliver intermediate speed ratios such as 1:1.5, 1:1.75, 1.5:1, or 1.75:1, for example. Other drives include a type of transmission generally known as a continuously variable transmission (or "CVT"), which includes a continuously variable variator. A CVT, in contrast to a stepped transmission, is configured to provide every fractional ratio in a given speed ratio range. For example, in the speed ratio range mentioned above, a CVT is generally capable of delivering any desired speed ratio between 1:2 and 2:1, which would include speed ratios such as 1:1.9, 1:1.1, 1.3:1, 1.7:1, etc. Yet other drives employ an infinitely variable transmission (or "IVT"). An IVT, like a CVT, is capable of producing every speed ratio in a given ratio range. However, in contrast to a CVT, the IVT is configured to deliver a zero output speed (a "powered zero" state) with a steady input speed. Hence, given the definition of speed ratio as the ratio of input speed to output speed, the IVT is capable of delivering an infinite set of speed ratios, and consequently, the IVT is not limited to a given ratio range. It should be noted that some transmissions use a continuously variable variator coupled to other gearing and/or clutches in a split powered arrangement to produce IVT functionality. However, as used here, the term IVT is primarily understood as comprehending an infinitely variable variator which produces IVT functionality without being necessarily coupled to additional gearing and/or clutches.

The field of mechanical power transmission is cognizant of continuous or infinitely variable variators of several types. For example, one well known class of continuous variators is the belt-and-variable-radius-pulley variator. Other known variators include hydrostatic, toroidal, and cone-and-ring variators. In some cases, these variators couple to other gearing to provide IVT functionality. Some hydromechanical variators can provide infinite ratio variability without additional gearing. Some variators, continuously and/or infinitely variable, are classified as frictional or traction variators because they rely on dry friction or elastohydrodynamic traction, respectively, to transfer torque across the variator. One example of a traction variator is a ball variator in which spherical elements are clamped between torque transfer elements and a thin layer of elastohydrodynamic fluid serves as the torque transfer conduit between the spherical and the torque transfer elements. It is to this latter class of variators that the embodiments disclosed here are most related.

There is a continuing need in the CVT/IVT industry for transmission and variator improvements in increasing efficiency and packaging flexibility, simplifying operation, and reducing cost, size, and complexity, among other things. The embodiments of the CVT and/or IVT methods, systems, subassemblies, components, etc., disclosed below address some or all of the aspects of this need.

SUMMARY OF THE INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of Certain Embodiments" one will understand how the features of the system and methods provide several advantages over traditional systems and methods.

One aspect of the disclosure relates to a transmission having a first disc mounted coaxially about a longitudinal axis of the transmission, a number of tiltable balls placed angularly about the longitudinal axis and in contact with the first disc, and a second disc mounted coaxially about the longitudinal axis of the transmission and in contact with the plurality of tiltable balls. In one embodiment, the transmission is provided with an idler placed radially inward of, and in contact with, the tiltable balls. The transmission has a cage operably coupled to the balls. In one embodiment, the transmission has a first clutch assembly operably coupled to the cage and the first disc. The transmission is provided with a second clutch assembly operably coupled to the cage and the first disc. At least two of the first disc, second disc, idler, and cage are adapted to receive a power input. At least one of the first disc, second disc, idler and cage is adapted to provide a power output.

Another aspect of the disclosure is concerned with a method of controlling a variable ratio transmission having a group of tiltable balls in contact with a first traction ring and a cage. The method includes the steps of receiving a number of signals and determining a target operating mode. In one embodiment, the method includes determining a command signal for a one-way clutch assembly. The method has the step of determining a command signal for a drive clutch assembly. In one embodiment, the method has the step of selectively engaging the one-way clutch assembly to the first traction ring and the cage based at least in part on the command signal for the one-way clutch assembly.

Yet another aspect of the disclosure relates to a method of controlling a variable ratio transmission having a number of tiltable balls in contact with a first traction ring and a cage. In one embodiment, the method has the step of providing a one-way clutch assembly selectively coupled to the first traction ring and the cage. The method includes providing a drive-clutch assembly selectively coupled to the first traction ring and the cage. In one embodiment, the method includes the step of receiving at least one signal indicative of a current operating mode of the transmission. The method includes receiving a user command signal and determining a target operating mode of the transmission based at least in part on the user command signal. In some embodiments, the method includes comparing the target operating mode to the current operating mode. The method has the step of commanding the one-way clutch assembly to selectively unlock the first traction ring and/or the cage. In one embodiment, the method has the step of commanding the drive clutch assembly to selectively engage the first traction ring and/or the cage.

Another aspect of the disclosure involves a carrier assembly for a infinitely variable transmission (IVT) having a group of spherical traction planets arranged about a main drive axis. In one embodiment, the carrier assembly has a first carrier plate having a center arranged coaxially with the main drive axis. The first carrier plate includes a first set of angularly offset slots cut into and arranged angularly about the center of the first carrier plate. Each of the first set of angularly offset slots has an angular offset from a centerline of the first carrier plate. The centerline of the first carrier plate is perpendicular to the main drive axis thereby forming a coordinate system. The coordinate system has a z-axis corresponding to the main drive axis, a y-axis corresponding to the centerline, and a x-axis perpendicular to the y-axis and z-axis. The first set of angularly offset guides lie in a plane formed by the x-axis and y-axis. Each traction planet is adapted to tilt in a plane formed by the y-axis and z-axis. In one embodiment, the carrier assembly has a second carrier plate that has a center arranged coaxially with the main drive axis. The second carrier plate includes a second set of angularly offset slots cut into and arranged angularly about the center of the second carrier plate. Each of the second set of angularly offset slots has an angular offset from a centerline of the second carrier plate. The centerline of the second carrier plate is perpendicular to the main drive axis thereby forming a coordinate system. The coordinate system has a z-axis corresponding to the main drive axis, a y-axis corresponding to the centerline, and a x-axis perpendicular to the y-axis and z-axis. The second set angularly offset guides lie in a plane formed by the x-axis and y-axis. Each traction planet is adapted to tilt in a plane formed by the y-axis and z-axis. The angular offset of the first set of angularly offset slots is opposite the angular offset of the second set of angularly offset slots.

Yet another aspect of the disclosure involves a method of controlling a variable ratio transmission in a vehicle. In one embodiment, the transmission has a group of tiltable balls in contact with a first traction ring and a cage. The method includes the steps of receiving a signal indicative of a desired operating mode of the vehicle; receiving a signal indicative of a vehicle speed; and receiving a signal indicative of a transmission ratio. The method has the step of determining a torque command based at least in part on the operating mode, vehicle speed, and transmission ratio. The method includes determining a ratio command based at least in part on the operating mode, vehicle speed, and transmission ratio. The method has the step of determining a weighted command of the torque command and the ratio command based at least in part on the operating mode, vehicle speed, and transmission ratio.

BRIEF DESCRIPTION OF THE FIGURES

FIG. 18 is a schematic illustration of a carrier assembly that can be used with a ball planetary infinitely variable transmission (IVT) having a power path control system.

FIG. 19 is a section view A-A of the carrier assembly of FIG. 18.

FIG. 20 is a plan view of a carrier plate of the carrier assembly of FIG. 18.

FIG. 21 is a plan view of another carrier plate of the carrier assembly of FIG. 18.

FIG. 22 is a plan view of another carrier plate of the carrier assembly of FIG. 18.

DETAILED DESCRIPTION OF CERTAIN EMBODIMENTS

Figure 1:
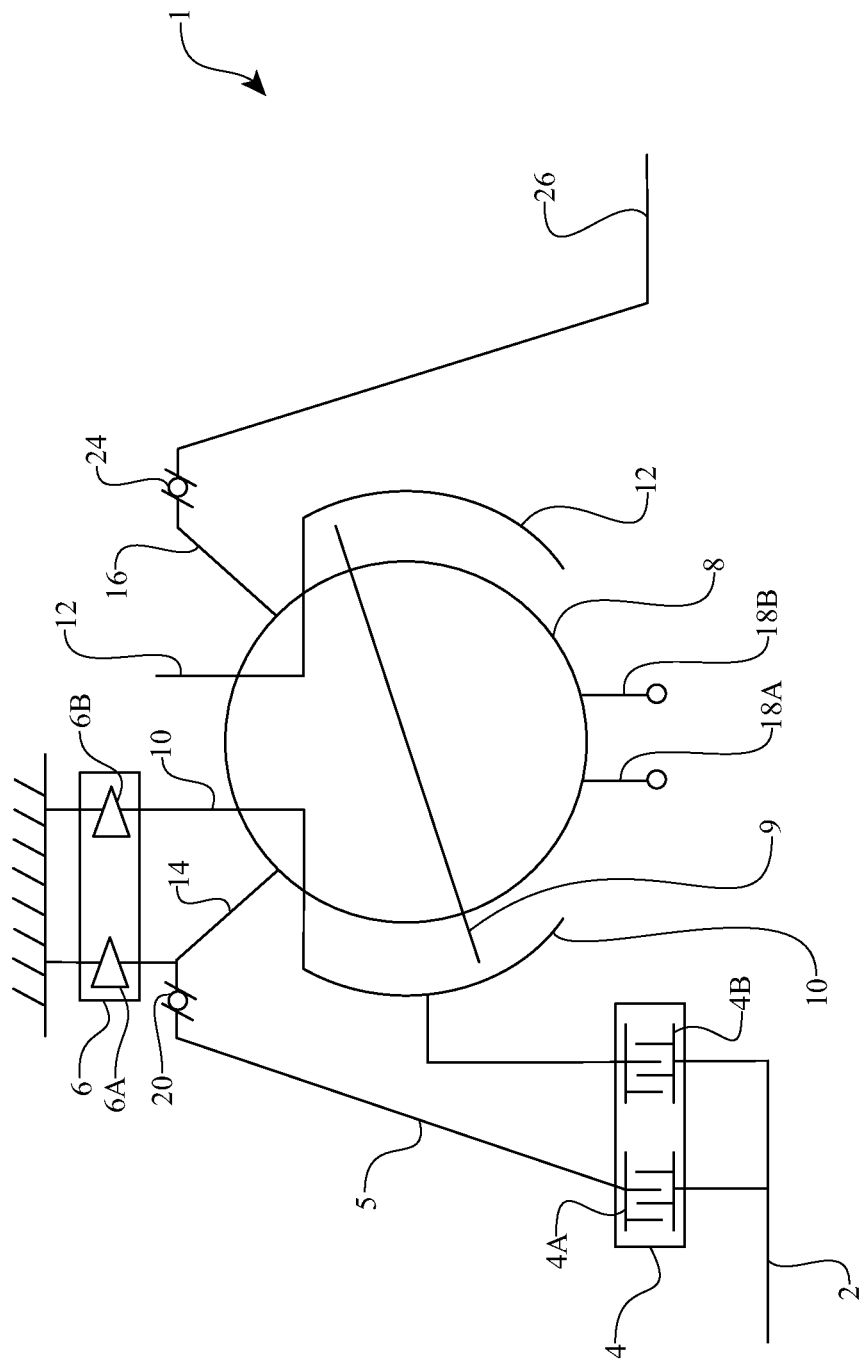
FIG. 1 is a schematic view of a ball planetary infinitely variable transmission (IVT) having a power path control system.

The preferred embodiments will be described now with reference to the accompanying figures, wherein like numerals refer to like elements throughout. The terminology used in the descriptions below is not to be interpreted in any limited or restrictive manner simply because it is used in conjunction with detailed descriptions of certain specific embodiments of the disclosure. Furthermore, embodiments of the disclosure can include several novel features, no single one of which is solely responsible for its desirable attributes or which is essential to practicing the embodiments described. Certain continuously variable transmission (CVT) and infinitely variable transmission (IVT) embodiments described here are generally related to the type disclosed in U.S. Pat. Nos. 6,241,636; 6,419,608; 6,689,012; 7,011,600; 7,166,052; U.S. patent application Ser. Nos. 11/243,484; 11/543,311; 12/198,402; 12/251,325 and Patent Cooperation Treaty patent applications PCT/US2007/023315, PCT/IB2006/054911, PCT/US2008/068929, and PCT/US2007/023315, PCT/US2008/074496. The entire disclosure of each of these patents and patent applications is hereby incorporated herein by reference.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe various embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

For description purposes, the term "radial" is used here to indicate a direction or position that is perpendicular relative to a longitudinal axis of a transmission or variator. The term "axial" as used here refers to a direction or position along an axis that is parallel to a main or longitudinal axis of a transmission or variator. For clarity and conciseness, at times similar components are labeled similarly.

It should be noted that reference herein to "traction" does not exclude applications where the dominant or exclusive mode of power transfer is through "friction." Without attempting to establish a categorical difference between traction and friction drives here, generally these may be understood as different regimes of power transfer. Traction drives usually involve the transfer of power between two elements by shear forces in a thin fluid layer trapped between the elements. The fluids used in these applications usually exhibit traction coefficients greater than conventional mineral oils. The traction coefficient (μ) represents the maximum available traction forces which would be available at the interfaces of the contacting components and is a measure of the maximum available drive torque. Typically, friction drives generally relate to transferring power between two elements by frictional forces between the elements. For the purposes of this disclosure, it should be understood that the CVTs and IVTs described here may operate in both tractive and frictional applications. For example, in the embodiment where an IVT is used for a bicycle application, the IVT can operate at times as a friction drive and at other times as a traction drive, depending on the torque and speed conditions present during operation.

Embodiments disclosed here can be related to the control of a variator and/or an IVT using generally spherical planets each having a tiltable axis of rotation (sometimes referred to here as a "planet axis of rotation") that can be adjusted to achieve a desired ratio of input speed to output speed during operation. In some embodiments, adjustment of said axis of rotation involves angular misalignment of the planet axis in a first plane in order to achieve an angular adjustment of the planet axis of rotation in a second plane, thereby adjusting the speed ratio of the variator. The angular misalignment in the first plane is referred to here as "skew" or "skew angle". This type of variator control is generally described in U.S. patent application Ser. Nos. 12/198,402 and 12/251,325, the entire disclosure of each of these patent applications is hereby incorporated herein by reference. In one embodiment, a control system coordinates the use of a skew angle to generate forces between certain contacting components in the variator that will tilt the planet axis of rotation in the second plane. The tilting of the planet axis of rotation adjusts the speed ratio of the variator. It should be noted that the embodiments disclosed herein may be implemented using other known methods for shifting a variator.

Embodiments of an infinitely variable transmission (IVT), and components and control methods thereof, will be described now with reference to FIGS. 1-22. FIG. 1 shows an IVT 1 that can be used in many applications including, but not limited to, automobiles, light electrical vehicles, hybrid human-, electric-, or internal combustion powered vehicles, industrial equipment, wind turbines, etc. Any technical application that requires modulation of mechanical power transfer between a power input and a power sink (for example, a load) can implement embodiments of the IVT 1 in its power train. For example, one-way dog clutches can be substituted by dry or wet standard clutch systems whereby the one way action is implemented through clutch controls.

Referring still to FIG. 1, in one embodiment the IVT 1 includes a main shaft 2 that substantially defines a longitudinal axis of the IVT 1. The main shaft 2 couples to an input power source (not shown). In some embodiments, the input power source can be a combustion engine, an electric motor, or any source of rotational power. The main shaft 2 is operably coupled to an engine drive clutch assembly 4. The engine drive clutch assembly can include a number of clutch elements configured to selectively engage certain components of the IVT 1. As an illustrative example, the engine drive clutch assembly 4 is depicted in FIG. 1 as having clutch elements 4A and 4B. In one embodiment, the IVT 1 includes a one-way clutch assembly 6 operably coupled to a non-rotating component, such as a housing. The one-way clutch assembly 6 can include a number of clutch elements configured to selectively engage certain components of the IVT 1. As an illustrative example, the one-way clutch assembly 6 is depicted in FIG. 1 as having clutch elements 6A and 6B.

Referring still to FIG. 1, the IVT 1 includes a plurality of traction planet assemblies 8 arranged angularly about the main shaft 2. Each traction planet assembly 8 is provided with a tiltable axis of rotation 9. The first and second carrier members 10, 12 are configured to guide the tiltable axes of rotation 9. The main shaft 2 couples through the clutch assembly 4 to the first ring driver 5 or to the first carrier member 10. The first and second carrier members 10, 12 are coaxial with the main shaft 2. In one embodiment, each traction planet assembly 8 is coupled to first and second traction rings 14, 16, respectively. Each traction planet assembly 8 is in contact with an idler assembly 18A, 18B at a radially inward location. The first traction ring 14 couples to a first axial force generator assembly 20. The second traction ring 16 is coupled to a second axial force generator 24. The second traction ring 16 and the second axial force generator 24 are coupled to an output power interface 26. The output power interface 26 can be coupled to a load (not shown). The traction planet assemblies 8, first and second traction rings 14, 16, and first and second carrier members 10, 12 may be referred to collectively as a "variator" portion of the IVT 1.

In one embodiment, the engine drive clutch assembly 4 can operably couple to at least the first carrier member 10 and/or the first ring driver 5. As an illustrative example, the clutch element 4A can be selectively coupled to the first ring driver 5; the clutch element 4B can be selectively coupled to the first carrier member 10. The one-way clutch assembly 6 can be operably coupled to at least the first carrier member 10 and/or the first traction ring 14. As an illustrative example, the clutch element 6A is selectively coupled to the first traction ring 14; the clutch element 6B is selectively coupled to the first carrier member 10. In other embodiments, the clutch element 6A can be selectively coupled to the first ring driver 5.

During operation of IVT 1, the engine drive clutch assembly 4 and the one-way clutch assembly 6 can be manipulated by a control system (not shown) to provide variable forward and reverse speeds. In one embodiment, the control system is an electro-hydraulic system having a number of electronically control hydraulic valves in communication with hydraulic clutch elements, such as clutch elements 4A, 4B, 6A, and 6B. For description purposes, the term "CVT mode" may be used to refer to operating conditions in which the IVT 1 provides forward speed; the term "IVT mode" may be used to refer to operating conditions in which the IVT 1 provides both forward and reverse speeds. In some embodiments, CVT mode is associated with an input power operably coupled to the first traction ring 14. In other embodiments, IVT mode is associated with an input power operably coupled to the first carrier member 10. Control processes will now be described as an illustrative example of the use of the engine drive clutch assembly 6 and the one-way clutch assembly 4 selectively engaging components of the IVT 1 in order to provide a CVT mode and IVT mode. These control processes can enable implementation of the IVT 1 into an automobile without the use of a torque converter or multi-speed gear box.

Figure 2:
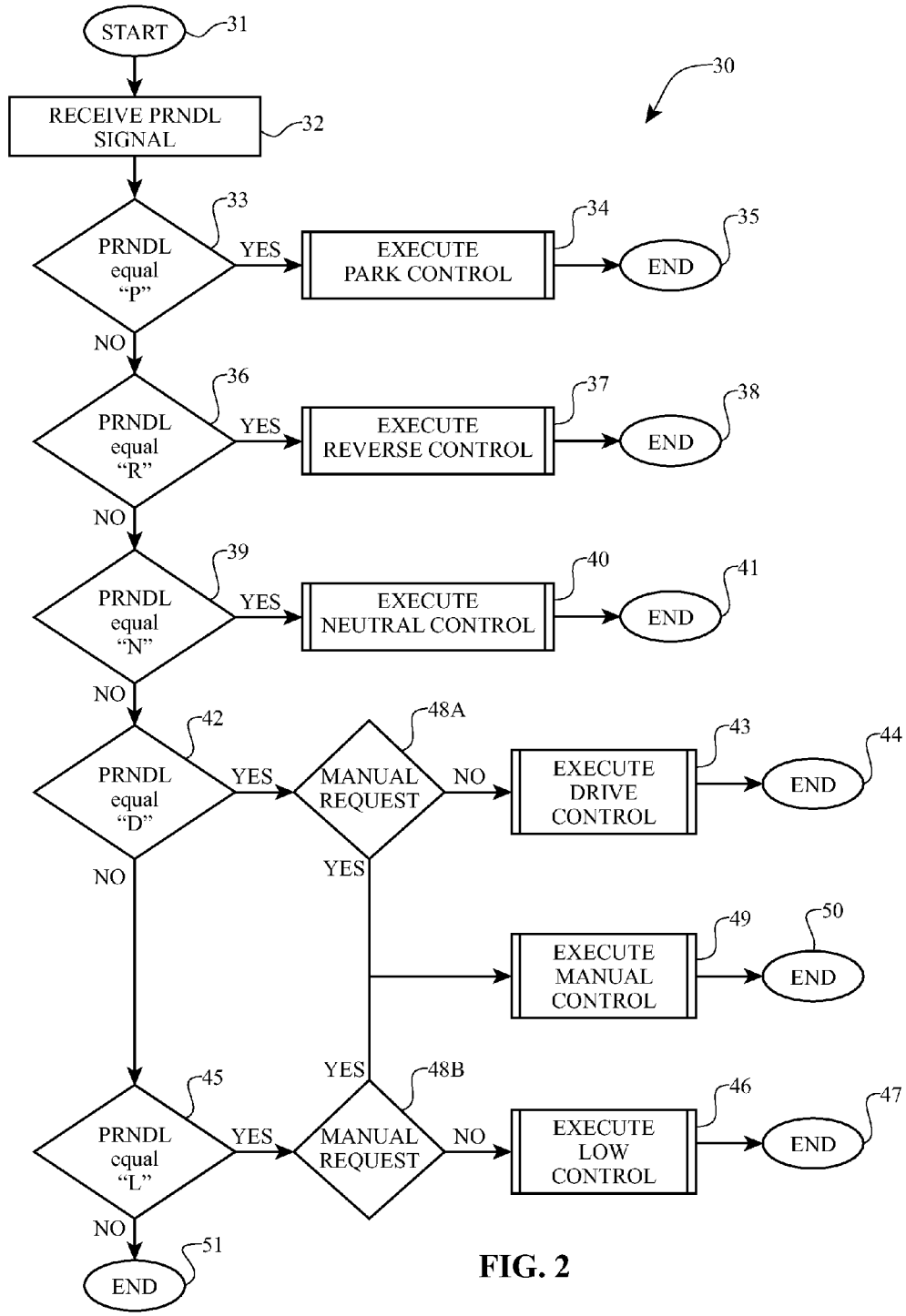
FIG. 2 is a block diagram of a control algorithm that can be used to determine a user command state of the IVT of FIG. 1.

Turning now to FIG. 2, in one embodiment a transmission control process 30 can be implement for control of the IVT 1, for example. In one embodiment, the transmission control process 30 begins at a state 31 and proceeds to a state 32 where a user command signal is received. In some embodiments, the user command signal received at state 32 is indicative of a control lever position, or a PRNDL position as is typical on an automobile. The transmission control process 30 proceeds to a state 33 where the PRNDL position is evaluated. If the PRNDL position is equal to "P", or a command for park, then the transmission control process 30 moves to a state 34 where a park control process is executed. The transmission control process 30 then proceeds to an end state 35. If the state 33 produces a negative result, the transmission control process 30 proceeds to a state 36. The PRNDL position is evaluated at the state 36. If the PRNDL position is equal to "R", or a command for reverse, then the transmission control process 30 moves to a state 37 where a reverse control process is executed. The transmission control process 30 then proceeds to an end state 38. If the state 36 produces a negative result, the transmission control process 30 moves to a state 39 at which the PRNDL position is evaluated. If the PRNDL position is equal to "N", or a command for a neutral state, then the transmission control process 30 proceeds to an execution of a neutral control process at state 40 and ends at state 41.

Referring still to FIG. 2, if the state 39 produces a negative result, then the transmission control process 30 proceeds to a state 42 at which the PRNDL position is evaluated. If the PRNDL position is equal to "D", or a command for drive, then the transmission control process 30 proceeds a state 48A. The state 48A evaluates a manual mode selection from the user. For example, a switch (not shown) can be used to indicate a desire for a manual shift mode of the variator and/or transmission. If the state 48A produces a positive result, the transmission control process 30 proceeds to a state 49 where a manual control mode is executed. The transmission control process 30 then proceeds to an end state 50. If the state 48A produces a negative result, the transmission control process 30 proceeds to a state 43 where a drive control process is executed. The transmission control process 30 then ends at a state 44. If the state 42 produces a negative result, the transmission control process 30 proceeds to a state 45 at which the PRNDL position is evaluated. If the PRNDL position is "L", or a command for low drive state, then the transmission control process 30 proceeds to a state 48B. The state 48B evaluates a manual mode request from the user. If the manual mode request from the user is negative, and the state 45 produced a positive result, then the transmission control process 30 proceeds to a state 46 where a low drive state control process is executed. The transmission control process 30 then ends at a state 47. If the state 45 produces a negative result, then the control process 30 ends at a state 51.

Figure 3:
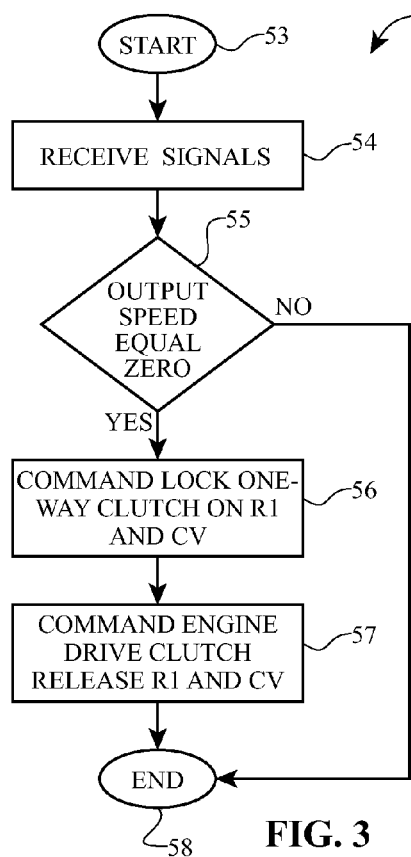
FIG. 3 is a block diagram of a control algorithm that can be used to establish a park condition for the IVT of FIG. 1.

Referring now to FIG. 3, in one embodiment, the park control process 34 begins at a state 53 and proceeds to a state 54 where signals are received from the transmission control process 30 and/or vehicle sensors. In some embodiments, the signals can include output transmission speed, vehicle speed, engine speed, throttle and/or brake position, and control lever positions such as a typical PRNDL indicator. In other embodiments, the transmission control process 30 communicates a command signal based at least in part on the result of the state 33, for example. The park control process 34 proceeds to a state 55 where vehicle speed and/or output speed is evaluated. If the output speed is not equal to zero, the park control process proceeds to an end state 58. It should be noted that in some embodiments, a control process can be implemented that monitors operating conditions for safety and, in some cases, can provide corrective actions if a user's request would result in potential transmission damage or unsafe driving condition. If the output speed is equal to zero, the park control process 34 proceeds to a state 56 where the one-way clutch assembly 6 is commanded to lock the first traction ring 14 and the first carrier member 10. The park control process 34 then proceeds to a state 57 wherein the engine drive clutch assembly 4 is commanded to release the first traction ring 14 and the first carrier member 10, for example. The park control process 34 then ends at the state 58.

Figure 4:
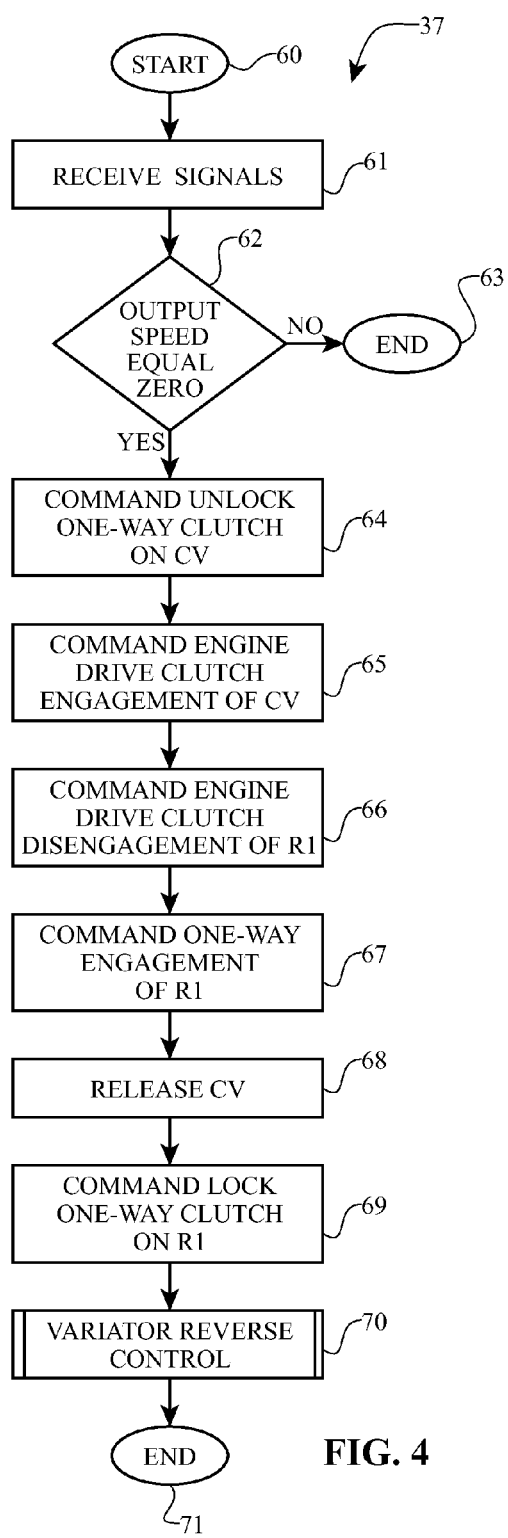
FIG. 4 is a block diagram of a control algorithm that can be used to establish a reverse condition for the IVT of FIG. 1.

Turning now to FIG. 4, in one embodiment, the reverse control process 37 begins at a state 60 and proceeds to a state 61 where signals are received. In one embodiment, the signals received at the state 61 are sent from the transmission control process 30. For example, the transmission control process 30 communicates a command signal based at least in part on the result of the state 36. In other embodiments, the signals can include output or input speed, vehicle speed, measured engine parameters, or any other signals indicative of operating condition. The reverse control process 37 proceeds to a state 62 where an output speed is evaluated. If the output speed is not equal to zero, then the reverse control process 37 proceeds to an end state 63. If the output speed is equal to zero, the reverse control process 37 proceeds to states 64, 65, 66, 67, 68, 69. It should be noted that states 64, 65, 66, 67, 68, 69 are presented in FIG. 4 as an illustrative example and the order in which the states 64, 65, 66, 67, 68, 69 are executed is dependent on a desired performance of the transmission and can be ordered by a designer as appropriate. For example, the timing and duration of states 64, 65, 66, 67, 68, 69 may arbitrarily overlap to produce a desired performance. At state 64, the one-way clutch 6 is commanded to unlock from the first carrier member 10. At state 65, the engine drive clutch 4 is commanded to engage the first carrier member 10. At state 66, the engine drive clutch 4 is commanded to release or disengage the first traction ring 14. At state 67, the one-way clutch 6 is commanded to engage the first traction ring 14. At state 68, the one-way clutch 6 is commanded to release the first carrier member 10. At state 69, the one-way clutch 6 is commanded to lock the first traction ring 14. The reverse control process 37 proceeds to a state 70. The state 70 can execute control of the variator portion of the IVT 1, for example, and maintain the variator in a reverse direction. In one embodiment, the reverse direction corresponds to a range of tilt angles of the tiltable axes 9. The reverse control process 37 ends at a state 71.

Figure 5:
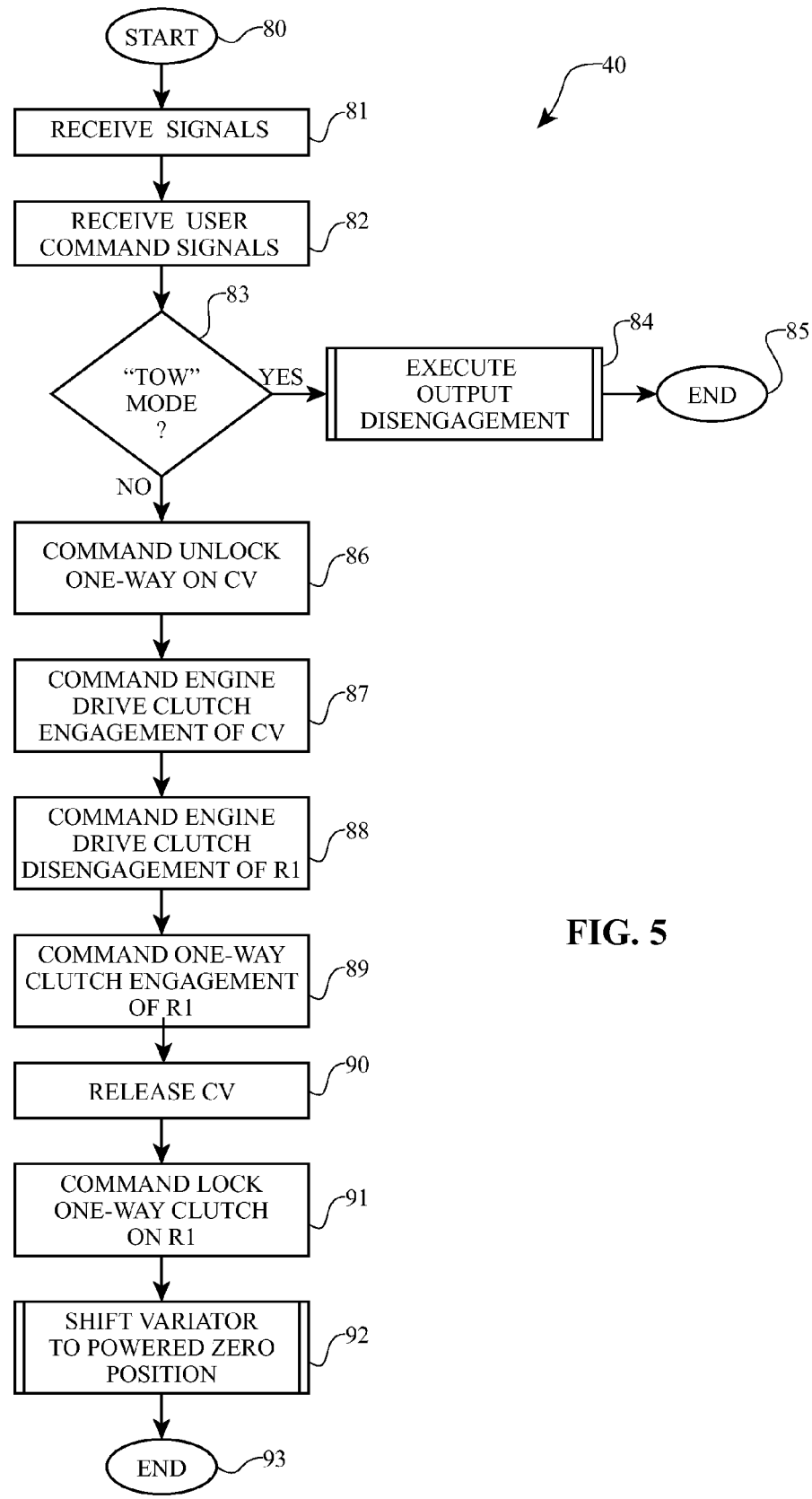
FIG. 5 is a block diagram of a control algorithm that can be used to establish a neutral position of the IVT of FIG. 1.

Turning now to FIG. 5, in one embodiment the neutral control process 40 begins at a state 80 and proceeds to a state 81 where a number of signals are received. The signals can be from sensors equipped on the IVT 1, an engine, and/or a vehicle. In some embodiments, the signals can be received from the transmission control process 30, for example. In one embodiment, the neutral control process 40 proceeds to a state 82 where at least one user command signal is received. The user command signal received at the state 82 can be indicative of a desired towing condition. As an illustrative example, a user of a vehicle equipped with the IVT 1, can use a switch to indicate a desire to push the vehicle while the engine is not running. The neutral control process 40 proceeds to a state 83 where a towing mode is evaluated. If the result of the state 83 is positive, the neutral control process 40 proceeds to a state 84 where and output disengagement control process is executed. For example, the state 84 can command a clutch or mechanism (not shown) to mechanically decouple the wheels of a vehicle from the IVT 1. The output disengagement control process then ends at a state 85.

Referring still to FIG. 5, if the result of the state 83 is negative, the neutral control process 40 proceeds to states 86, 87, 88, 89, 90, 91. It should be noted that states 86, 87, 88, 89, 90, 91 are presented in FIG. 5 as an illustrative example and the order in which the states 86, 87, 88, 89, 90, 91 are executed is dependent on a desired performance of the transmission and can be ordered by a designer as appropriate. In fact the timing and duration of states 86, 87, 88, 89, 90, 91 may arbitrarily overlap to produce a desired performance. At state 86, the one-way clutch 6 is commanded to unlock from the first carrier member 10. At state 87, the engine drive clutch 4 is commanded to engage the first carrier member 10. At state 88, the engine drive clutch 4 is commanded to release or disengage the first traction ring 14. At state 89, the one-way clutch 6 is commanded to engage the first traction ring 14. At state 90, the one-way clutch 6 is commanded to release the first carrier member 10. At state 91, the one-way clutch 6 is commanded to lock the first traction ring 14. The neutral control process 40 proceeds to a state 92. The state 92 can execute control of the variator portion of the IVT 1, for example, and maintain the variator in a zero output speed condition. In one embodiment, the zero output speed corresponds to a tilt angle of the tiltable axes 9 that is substantially parallel to the longitudinal axis of the IVT 1. The neutral control process 40 ends at a state 93.

Figure 6:
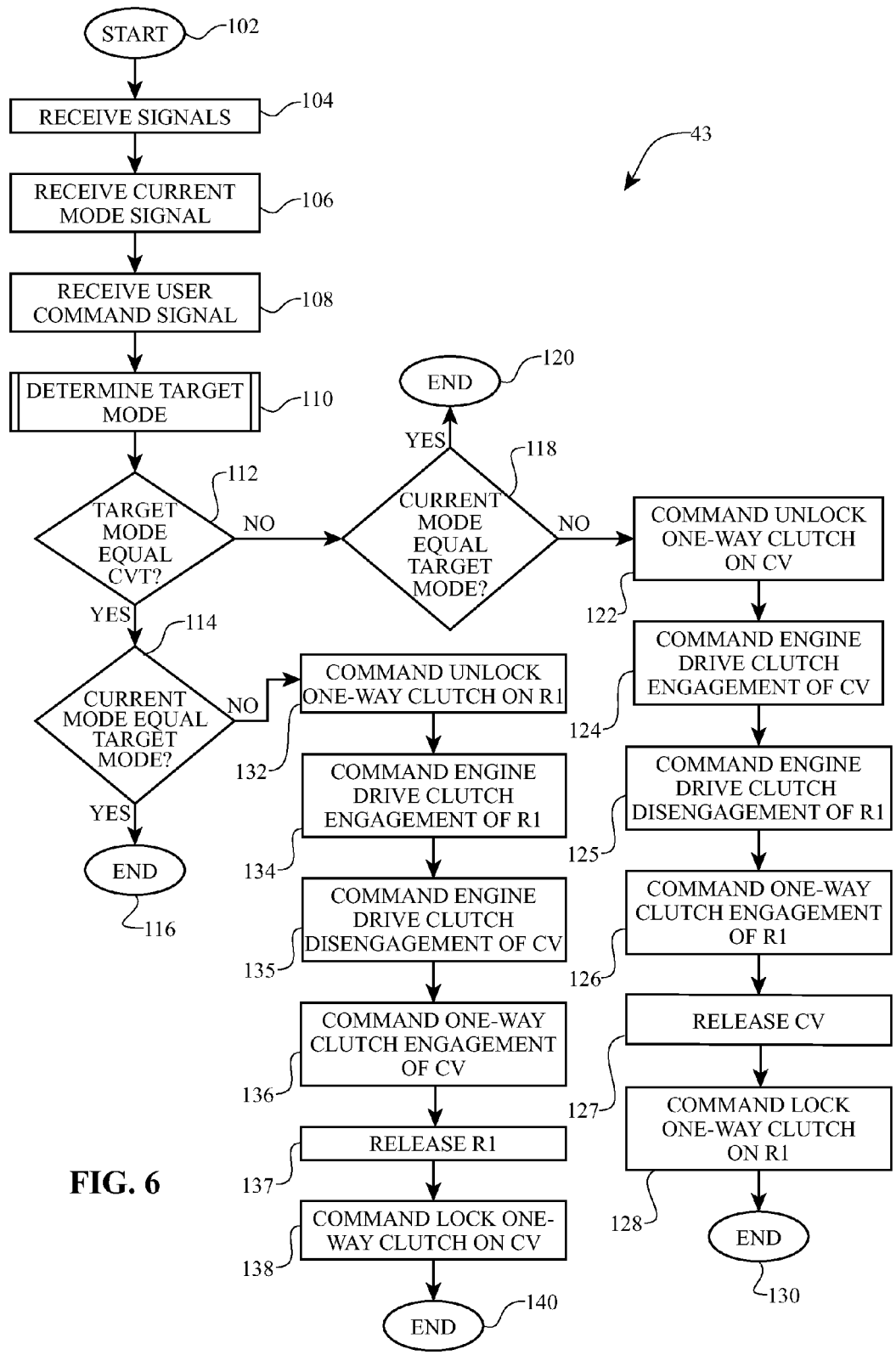
FIG. 6 is a block diagram of a control algorithm that can be used with the IVT of FIG. 1.

Referring now to FIG. 6, in one embodiment, the drive control process 43 begins at a state 102 and proceeds to a state 104 where signals are received. The signal received in state 104 can be indicative of a gear shift signal, a throttle position of a vehicle, and/or an output speed signal. The drive control process 43 proceeds to a state 106 where a signal is received that is indicative of a current operating mode of the transmission. In some embodiments, a number of operating modes can be identified relating to the operating condition of the IVT 1. For example, certain operating conditions may be achieved in a "CVT" mode, whereas other operating conditions may be achieved in an "IVT" mode. The drive control process 43 can be implemented to control the engine drive clutch 4 and/or the one-way clutch 6 to achieve appropriate operating mode for the vehicle performance commanded by a user.

The drive control process 43 proceeds to a state 108 where a command signal is received. In one embodiment, the command signal is indicative of a desired output speed and/or a desired transmission operating mode. The drive control process 43 proceeds to a state 110 where a target transmission operating mode is determined. In one embodiment, the target transmission operating mode is a function at least in part on the output speed of the transmission, the speed ratio of the transmission, throttle/brake sensor readings, engine speed, and/or acceleration states of the vehicle. In some embodiments, the target transmission operating mode is a function at least in part on a speed of a vehicle. In other embodiments, the target transmission operating mode is a function at least in part on a control lever position. In one embodiment, the state 110 evaluates a look-up table using the aforementioned signals. In some embodiments, the state 110 performs an algorithm to determine the target transmission ratio.

Referring still to FIG. 6, in one embodiment, the drive control process 43 includes a state 112 where the target transmission operating mode determined in state 110 is evaluated. If the target transmission operating mode determined in state 110 is equal to a "CVT" mode, the control process continues to a state 114. At state 114, the current transmission operating mode is evaluated. If the current transmission operating mode is equal to the target transmission operating mode of "CVT" then the drive control process 43 proceeds to an end state 116. If the target transmission operating mode determined in state 110 is not equal to a "CVT" mode, the control process 43 continues to a state 118. At state 118, the current transmission operating mode is compared to the target transmission operating mode. If the target transmission operating mode is equal to the current transmission operating mode, the drive control process 43 continues to an end state 120. If the target transmission operating mode does not equal the current transmission operating mode, the control process 43 proceeds to states 122, 124, 125, 126, 127, 128. It should be noted that states 122, 124, 125, 126, 127, 128 are presented in FIG. 6 as an illustrative example and the order in which the states 122, 124, 125, 126, 127, 128 are executed is dependent on a desired performance of the transmission and can be ordered by a designer as appropriate. In fact the timing and duration of states 122, 124, 125, 126, 127, 128 may arbitrarily overlap to produce a desired performance. The drive control process 43 includes the state 122 at which a command is sent to unlock a one-way clutch assembly such as one-way clutch assembly 6. In one embodiment, the one-way clutch assembly 6 will unlock from the first carrier member 10 at state 122. The drive control process 43 includes the state 124 at which an engine drive clutch assembly, such as the engine drive clutch assembly 4, is commanded to engage the first carrier member 10. At state 125, the engine drive clutch 4 is commanded to release or disengage the first traction ring 14. The drive control process 43 includes the state 126 at which the one-way clutch assembly 6 is commanded to engine the first traction ring 14. At state 127, the one-way clutch assembly 6 is commanded to release the first carrier member 10. The drive control process 43 includes the state 128 at which the one-way clutch assembly 6 is commanded to lock the first traction ring 14. Upon execution of states 122, 124, 125, 126, 127 128, the drive control process 43 proceeds to an end state 130.

Referring again to FIG. 6, in one embodiment, the drive control process 43 includes the state 114. At state 114, the current transmission operating mode is evaluated. If the current transmission operating mode is not equal to the target transmission operating mode of "CVT" then the drive control process 43 proceeds to states 132, 134, 135, 136, 137, 138. It should be noted that states 132, 134, 135, 136, 137, 138 are presented in FIG. 6 as an illustrative example and the order in which the states 132, 134, 135, 136, 137, 138 are executed is dependent on a desired performance of the transmission and can be ordered by a designer as appropriate. The timing and duration of states 132, 134, 135, 136, 137, 138 may arbitrarily overlap to produce a desired performance. The drive control process 43 includes the state 132 at which the one-way clutch assembly 6 is commanded to unlock the first traction ring 14. The drive control process 43 includes the state 134 at which the engine drive clutch assembly 4 is commanded to engage the first traction ring 14. At state 135, the engine drive clutch 4 is commanded to release or disengage the first carrier member 10. The drive control process 43 includes the state 136 at which the one-way clutch assembly 6 is commanded to engage the first carrier member 10. At state 137, the one-way clutch assembly 6 is commanded to release the first traction ring 14. The engagement of the first carrier member 10 and the release of the first traction ring 14 can be substantially simultaneous actions. The drive control process 43 includes the state 138 at which the one-way clutch assembly 6 is commanded to lock the first carrier member 10. Upon execution of states 132, 134, 135, 136, 137, 138, the control process 43 proceeds to an end state 140.

During operation of the IVT 1, the drive control process 43 can be implemented to provide infinitely variable range in forward and reverse directions. In some applications, such as an automobile, it is desirable to have overdrive through underdrive speed ranges and reverse speed ranges. Implementation of drive control process 43 can enable vehicle launch from zero speed though operation of IVT 1 and without the use of a typical torque converter.

Figure 7:
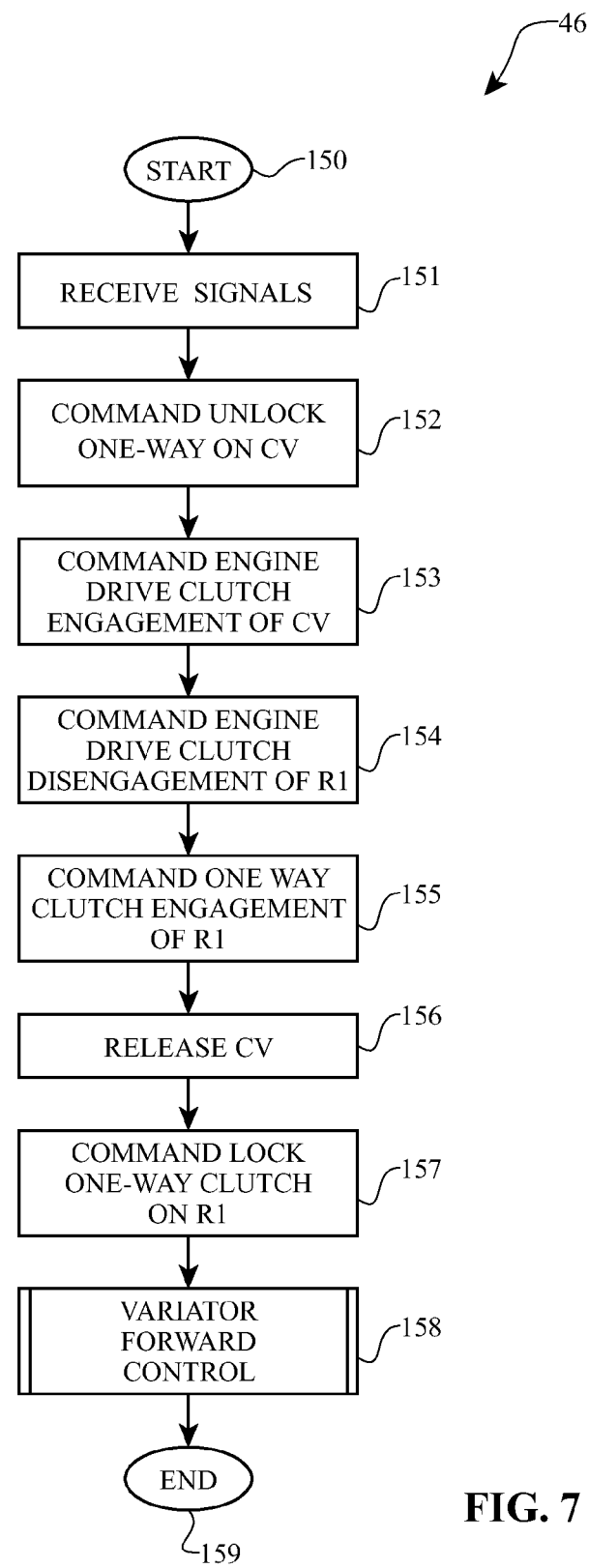
FIG. 7 is a block diagram of another control algorithm that can be used with the IVT of FIG. 1.

Turning now to FIG. 7, in one embodiment, the low drive control process 46 begins at a state 150 and proceeds to a state 151 where a number of signals can be received. In one embodiment, the state 151 receives signals from the transmission control process 30, for example, to indicate a user command for a low drive condition. The low drive control process 46 proceeds to states 152, 153, 154, 155, 156, 157. It should be noted that states 152, 153, 154, 155, 156, 157 are presented in FIG. 7 as an illustrative example and the order in which the states 152, 153, 154, 155, 156, 157 are executed is dependent on a desired performance of the transmission and can be ordered by a designer as appropriate. In fact the timing and duration of states 152, 153, 154, 155, 156, 157 may arbitrarily overlap to produce a desired performance. At state 152, the one-way clutch 6 is commanded to unlock the first carrier member 10. At state 153, the engine drive clutch 4 is commanded to engage the first carrier member 10. At state 154, the engine drive clutch 4 is commanded to release or disengage the first traction ring 14. At state 155, the one-way clutch 4 is commanded to engage the first traction ring 14. At state 156, the one-way clutch 6 is commanded to release the first carrier member 10. At state 156, the one-way clutch 6 is commanded to lock the first traction ring 14. The low drive control process 46 proceeds to a state 158. The state 158 can execute control of the variator portion of the IVT 1, for example, and maintain the variator in a forward direction. In one embodiment, the forward direction corresponds to a range of tilt angles of the tiltable axes 9. The low drive control process 46 ends at a state 159.

Figure 8:
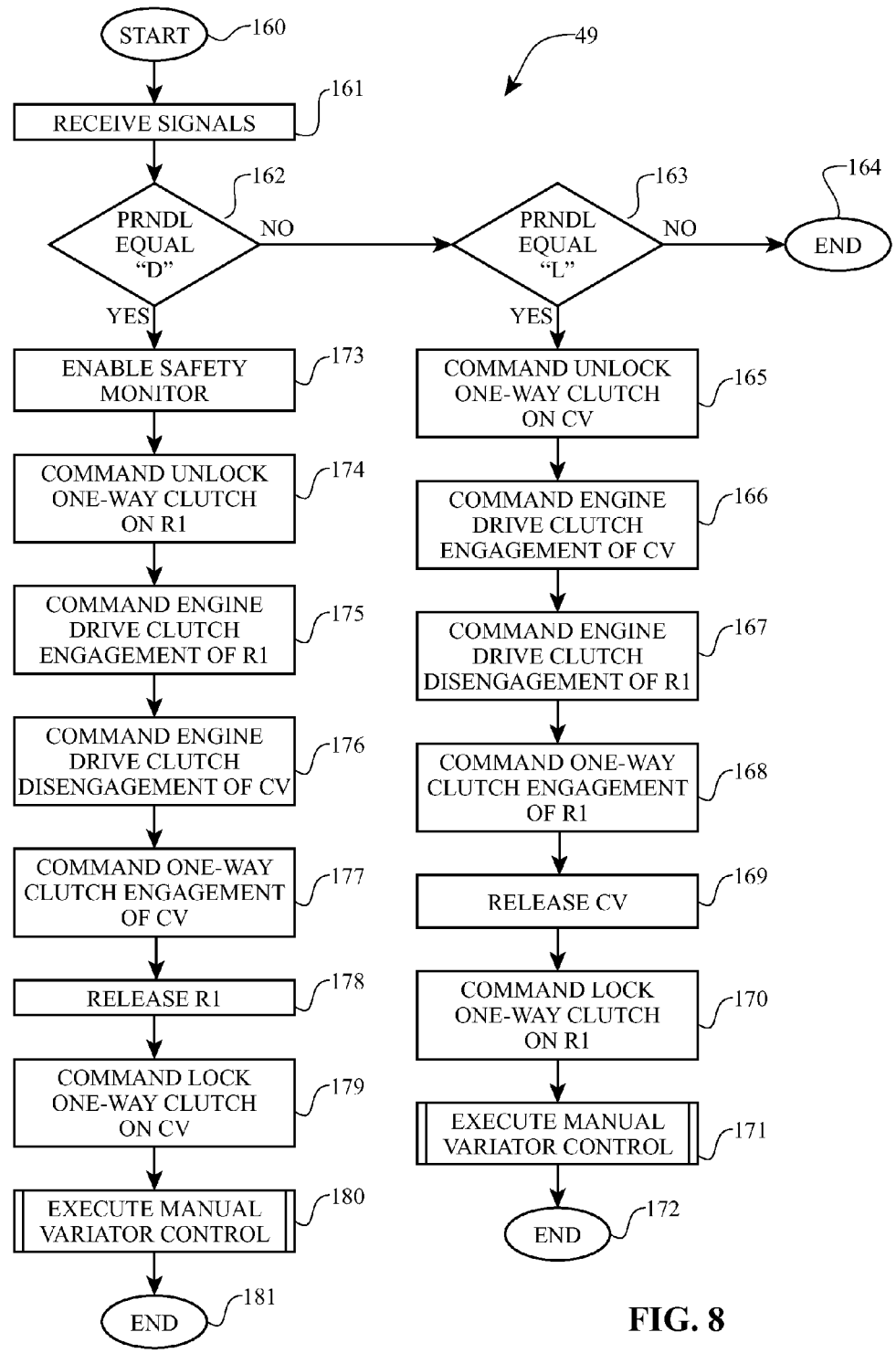
FIG. 8 is a block diagram of a manual control mode algorithm that can be used with the IVT of FIG. 1.

Referring now to FIG. 8, in one embodiment, the manual control process 49 begins at a state 160 and proceeds to a state 161. A number of signals can be received at the state 161 that can include signals indicative of vehicle operating conditions and/or signals generated from control processes such as the transmission control process 30. The manual control process 49 proceeds to a state 162. The state 162 evaluates a signal from a control lever. If the position corresponds to a "D" or a drive command, the state 162 produces a positive result. If a negative result is produced at the state 162, the manual control process 49 proceeds to a state 163. The state 163 evaluates the signal from the control lever. If the position corresponds to an "L" or low drive command, the state 163 produces a positive result. If the state 163 produces a negative result, the manual control process 49 ends at a state 164. If the state 163 produces a positive result, the manual control process 49 proceeds to states 165, 166, 167, 168, 169, 170. It should be noted that states 165, 166, 167, 168, 169, 170 are presented in FIG. 8 as an illustrative example and the order in which the states 165, 166, 167, 168, 169, 170 are executed is dependent on a desired performance of the transmission and can be ordered by a designer as appropriate. In fact the timing and duration of states 165, 166, 167, 168, 169, 170 may arbitrarily overlap to produce a desired performance. At state 165, the one-way clutch assembly 6 is commanded to unlock the first carrier member 10. At state 166, the engine drive clutch assembly 4 is commanded to engage the first carrier member 10. At state 167, the engine drive clutch 4 is commanded to release or disengage the first traction ring 14. At state 168, the one-way clutch assembly 4 is commanded to engage the first traction ring 14. At state 169, the one-way clutch assembly 6 is commanded to release the first carrier member 10. At state 170, the one-way clutch assembly 6 is commanded to lock the first traction ring 14. The manual control process 49 proceeds to a process 171. The process 171 executes a control algorithm for user control of the variator portion of the IVT 1. For example, a user can use an auxiliary or dual-path control lever to communicate a desired change in transmission ratio such as an up-shift or a down-shift. The manual control process 49 ends at a state 172.

Referring still to FIG. 8, if the state 162 produces a positive result, the manual control process 49 proceeds to a state 173. The state 173 enables a safety monitoring control algorithm that can limit operation of the IVT 1 within predetermined operating conditions. For example, the state 173 may automatically proceed to the state 164 if speed conditions make manual drive operation undesirable. The manual control process 49 proceeds to states 174, 175, 176, 177, 178, 179. It should be noted that states 174, 175, 176, 177, 178, 179 are presented in FIG. 8 as an illustrative example and the order in which the states 174, 175, 176, 177, 178, 179 are executed is dependent on a desired performance of the transmission and can be ordered by a designer as appropriate. In fact the timing and duration of states 174, 175, 176, 177, 178, 179 may arbitrarily overlap to produce a desired performance. At state 174, the one-way clutch assembly 6 is commanded to unlock the first traction ring 14. At state 175, the engine drive clutch assembly 4 is commanded to engage the first traction ring 14. At state 176, the engine drive clutch 4 is commanded to release or disengage the first carrier member 10. At state 177, the one-way clutch assembly 6 is commanded to engage the first carrier member 10. At state 178, the one-way clutch assembly 6 is commanded to release the first traction ring 14. At state 179, the one-way clutch assembly 6 is commanded to lock the first carrier member 10. The manual control process 49 proceeds to a process 180. The process 180 executes a control algorithm for user control of the variator portion of the IVT 1. For example, a user can use an auxiliary or dual-path control lever to communicate a desired change in transmission ratio such as an up-shift or a down-shift. The manual control process 49 ends at a state 181.

Figure 8A:
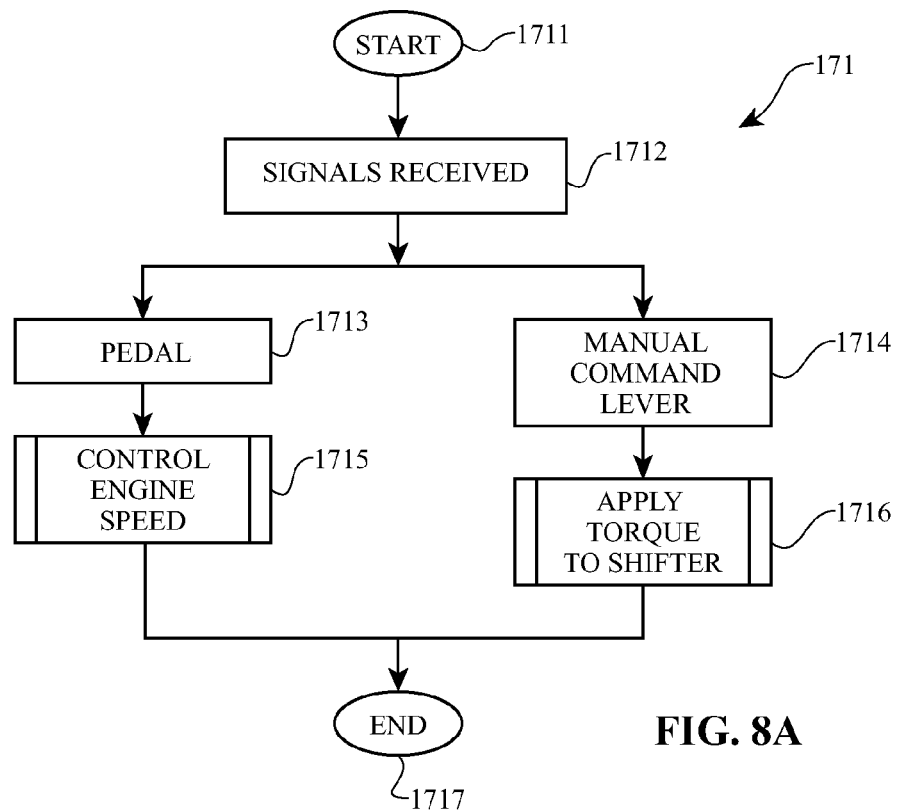
FIG. 8A is a block diagram of a control algorithm that can be used in the algorithm of FIG. 8.

Referring now to FIG. 8A, in one embodiment, the process 171 begins at a state 1711 and proceeds to a state 1712 where a number of signals are received. The process 171 proceeds to a state 1713 where a position of an accelerator pedal is evaluated. The process 171 proceeds in parallel to a state 1714 where a signal indicative of a manual command from a user is evaluated. The process 171 proceeds from the state 1713 to a process 1715 where an engine speed is controlled based on the evaluation in the state 1713. The process 171 proceeds from the state 1714 to a process 1716 where a shift torque is determined and applied based on the evaluation in the state 1714. The process 171 ends at a state 1717.

Figure 8B:
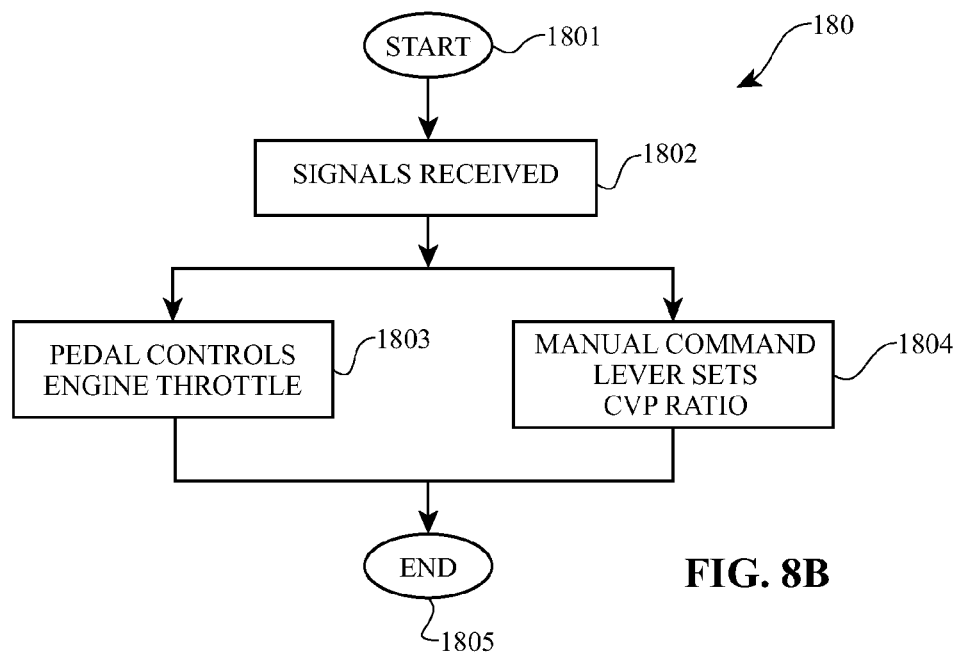
FIG. 8B is another block diagram of a control algorithm that can be used in the algorithm of FIG. 8.

Turning now to FIG. 8B, in one embodiment, the process 180 can begin at a state 1801 and proceed to a state 1802 where a number of signals are received. The process 180 proceeds to a process 1803 where an engine throttle is controlled based at least in part on the signals received in the state 1802. The process 180 proceed in parallel from the state 1802 to the process 1804 where a user command via a manual lever, for example, is used to control the ratio of the transmission. The process 180 ends at a state 1805.

Figure 9:
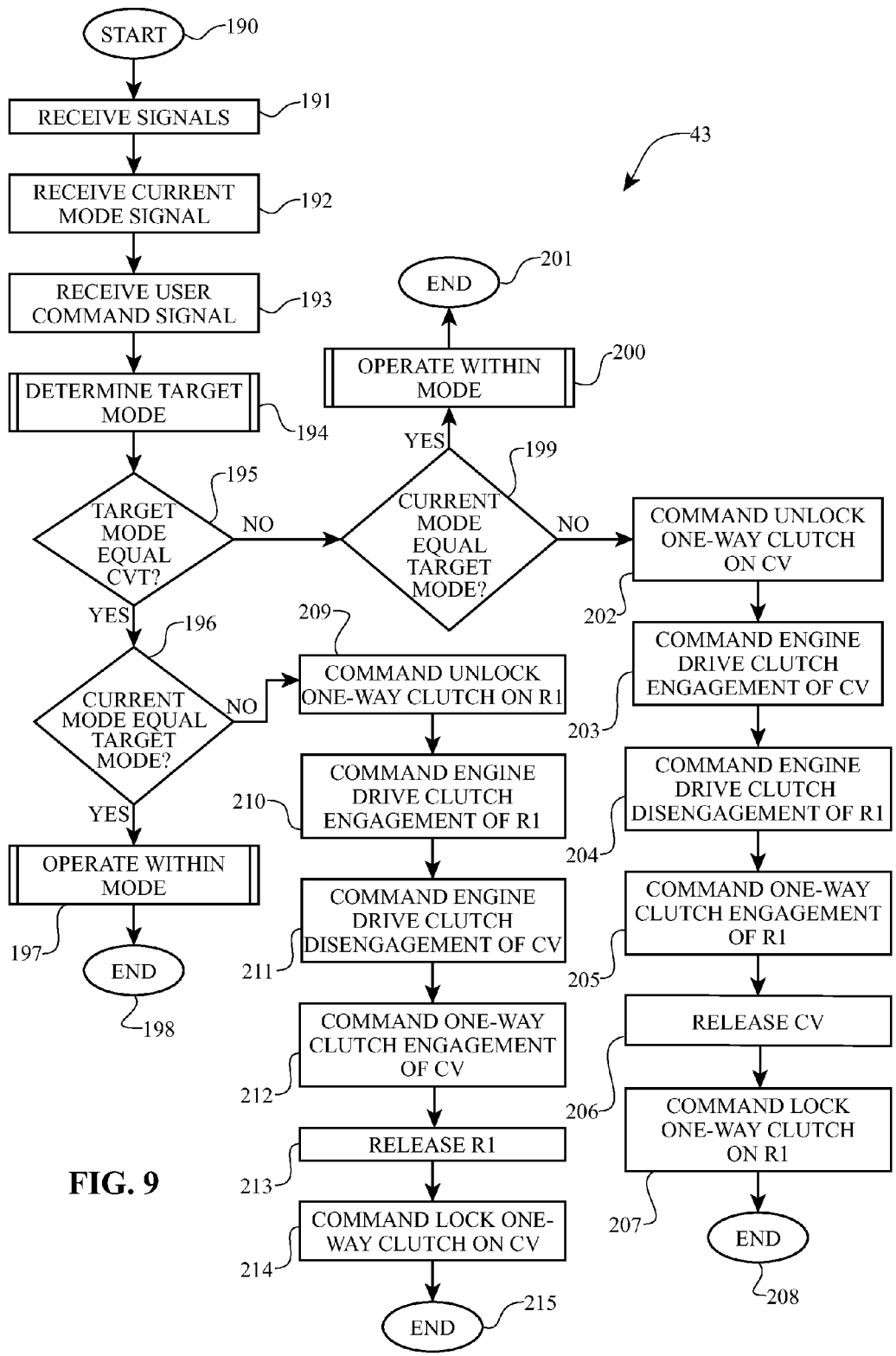
FIG. 9 is a block diagram of another control algorithm that can be used with the IVT of FIG. 1.

Referring now to FIG. 9, in one embodiment, the drive control process 43 begins at a state 190 and proceeds to a state 191 where signals are received. The signal received in state 191 can be indicative of a gear shift signal, a throttle position of a vehicle, and/or an output speed signal. The drive control process 43 proceeds to a state 192 where a signal is received that is indicative of a current operating mode of the transmission. In some embodiments, a number of operating modes can be identified relating to the operating condition of the IVT 1. For example, certain operating conditions may be achieved in a "CVT" mode, whereas other operating conditions may be achieved in an "IVT" mode. The drive control process 43 can be implemented to control the engine drive clutch 4 and/or the one-way clutch 6 to achieve appropriate operating mode for the vehicle performance commanded by a user.

The drive control process 43 proceeds to a state 193 where a command signal is received. In one embodiment, the command signal is indicative of a desired output speed and/or a desired transmission operating mode. The drive control process 43 proceeds to a state 194 where a target transmission operating mode is determined. In one embodiment, the target transmission operating mode is a function at least in part on the output speed of the transmission, the speed ratio of the transmission, throttle/brake sensor readings, engine speed, and/or acceleration states of the vehicle. In some embodiments, the target transmission operating mode is a function at least in part on a speed of a vehicle. In other embodiments, the target transmission operating mode is a function at least in part on a control lever position. In one embodiment, the state 194 evaluates a look-up table using the aforementioned signals. In some embodiments, the state 194 performs an algorithm to determine the target transmission ratio.

Referring still to FIG. 9, in one embodiment, the drive control process 43 includes a state 195 where the target transmission operating mode determined in state 194 is evaluated. If the target transmission operating mode determined in state 194 is equal to a "CVT" mode, the control process continues to a state 196. At state 196, the current transmission operating mode is evaluated. If the current transmission operating mode is equal to the target transmission operating mode of "CVT" then the drive control process 43 proceeds to an operating process 197 in which a control algorithm for operating the transmission in the current mode is executed. The control process 43 proceeds to an end state 198.

If the target transmission operating mode determined in state 194 is not equal to a "CVT" mode, the control process 43 continues to a state 199. At state 199, the current transmission operating mode is compared to the target transmission operating mode. If the target transmission operating mode is equal to the current transmission operating mode, the drive control process 43 continues to an operating process 200 in which a control algorithm for operating the transmission in the current transmission mode is executed. The control process 43 proceeds to an end state 201.

If the target transmission operating mode does not equal the current transmission operating mode, the control process 43 proceeds to states 202, 203, 204, 205, 206, 207. It should be noted that states 202, 203, 204, 205, 206, 207 are presented in FIG. 9 as an illustrative example and the order in which the states 202, 203, 204, 205, 206, 207 are executed is dependent on a desired performance of the transmission and can be ordered by a designer as appropriate. In fact the timing and duration of states 202, 203, 204, 205, 206, 207 may arbitrarily overlap to produce a desired performance. The drive control process 43 includes the state 202 at which a command is sent to unlock a one-way clutch assembly such as one-way clutch assembly 6. In one embodiment, the one-way clutch assembly 6 will unlock from the first carrier member 10 at state 202. The drive control process 43 includes the state 203 at which an engine drive clutch assembly, such as the engine drive clutch assembly 4, is commanded to engage the first carrier member 10. At state 204, the engine drive clutch 4 is commanded to release or disengage the first traction ring 14. The drive control process 43 includes the state 205 at which the one-way clutch assembly 6 is commanded to engine the first traction ring 14. At state 206, the one-way clutch assembly 6 is commanded to release the first carrier member 10. The drive control process 43 includes the state 207 at which the one-way clutch assembly 6 is commanded to lock the first traction ring 14. Upon execution of states 202, 203, 204, 205, 206, 207, the drive control process 43 proceeds to an end state 208.

Referring again to FIG. 9, in one embodiment, the drive control process 43 includes the state 196. At state 196, the current transmission operating mode is evaluated. If the current transmission operating mode is not equal to the target transmission operating mode of "CVT" then the drive control process 43 proceeds to states 209, 210, 211, 212, 213, 214. It should be noted that states 209, 210, 211, 212, 213, 214 are presented in FIG. 6 as an illustrative example and the order in which the states 209, 210, 211, 212, 213, 214 are executed is dependent on a desired performance of the transmission and can be ordered by a designer as appropriate. The timing and duration of states 209, 210, 211, 212, 213, 214 may arbitrarily overlap to produce a desired performance. The drive control process 43 includes the state 209 at which the one-way clutch assembly 6 is commanded to unlock the first traction ring 14. The drive control process 43 includes the state 210 at which the engine drive clutch assembly 4 is commanded to engage the first traction ring 14. At state 211, the engine drive clutch 4 is commanded to release or disengage the first carrier member 10. The drive control process 43 includes the state 212 at which the one-way clutch assembly 6 is commanded to engage the first carrier member 10. At state 213, the one-way clutch assembly 6 is commanded to release the first traction ring 14. The engagement of the first carrier member 10 and the release of the first traction ring 14 can be substantially simultaneous actions. The drive control process 43 includes the state 214 at which the one-way clutch assembly 6 is commanded to lock the first carrier member 10. Upon execution of states 209, 210, 211, 212, 213, 214, the control process 43 proceeds to an end state 215.

Figure 10:
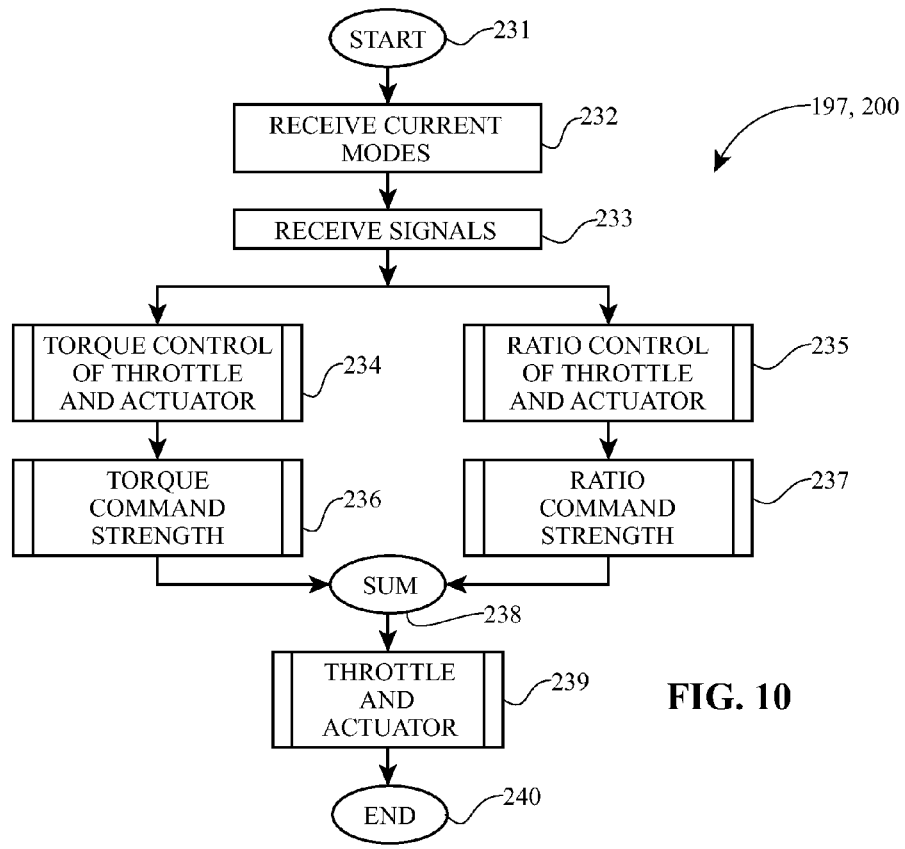
FIG. 10 is a block diagram of a control algorithm that can be used to operate in a CVT mode or an IVT mode of the IVT of FIG. 1.

Turning now to FIG. 10, in one embodiment, the operating process 197, 200 can begin at a state 231 and proceed to a state 232 where a signal indicative of the current operating mode is received. For example, the operating mode can be "CVT" or "IVT". The process 197, 200 proceeds to a state 233 where a number of signals are received. For example, the signals can be indicative or a throttle position, a speed ratio, and engine speed, a vehicle speed and/or signals associated with the shift actuator. The process 197, 200 proceeds to a torque control process 234 and a ratio control process 235. The processes 234, 235 determine an actuator and engine throttle command based at least in part on a required torque or a required ratio, respectively. The process 197, 200 proceeds to a processes 236 at which the current mode, vehicle speed, and transmission ratio are evaluated to determine the command strength from torque and ratio control signals applied to the engine throttle and actuator load, respectively. The actuator command, for example, may be a hydraulic pressure. As the control system transitions from 100% torque control to 100% ratio control the applied pressure becomes the sum of the weighted commands from processes 236, 237. The result is a smooth and stable transition between these different control regimes. The processes 197, 200 proceeds to state 238 where the weighed command strengths are summed. The process 197, 200 proceeds to a state 239 where the determined actuator and engine throttle commands are applied to the transmission and engine. The process 197 ends at a state 240.

Figure 10A:
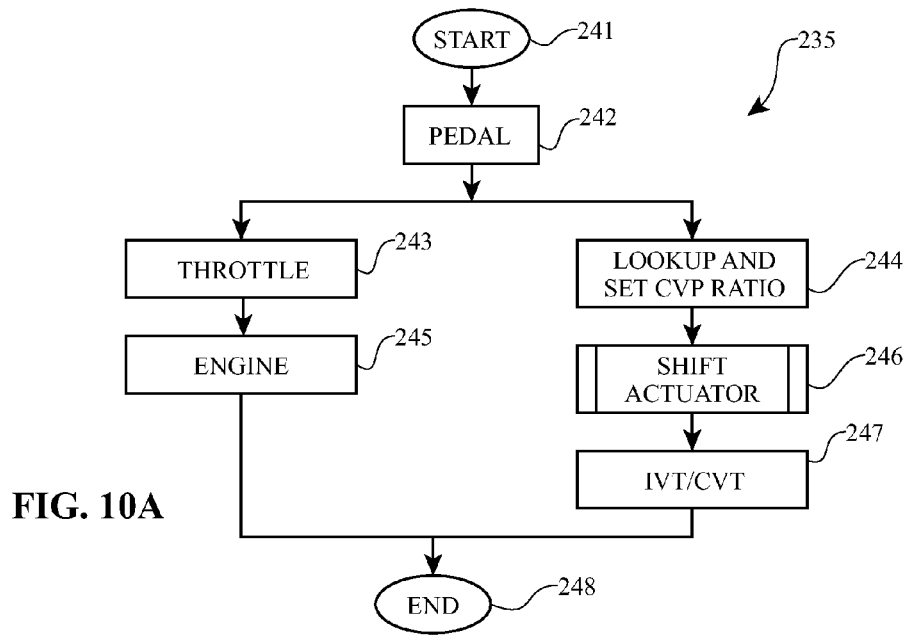
FIG. 10A is another block diagram of a control algorithm that can be used to operate in a CVT or an IVT mode of the IVT of FIG. 1.

Referring now to FIG. 10A, in one embodiment, the ratio control process 235 starts at a state 241 and proceeds to a state 242 where an accelerator pedal position is evaluated. The process 235 proceeds in parallel to states 243, 244. At state 243, an engine throttle command is determined based at least in part on the evaluation at the state 242. At state 244, the transmission ratio is determined based at least in part on the evaluation at the state 242. The process 235 proceeds to a process 246 at which a transmission shift actuator is controlled to achieve the transmission ratio determined at the state 244. The process 235 proceeds from the state 243 to a state 245 where an engine control process applies the throttle command determined in the state 243. The process 235 proceeds from the state 246 to a state 247 where the shift actuator command determined in the state 246 is applied to the transmission. The process 235 ends at a state 248.

Figure 11:
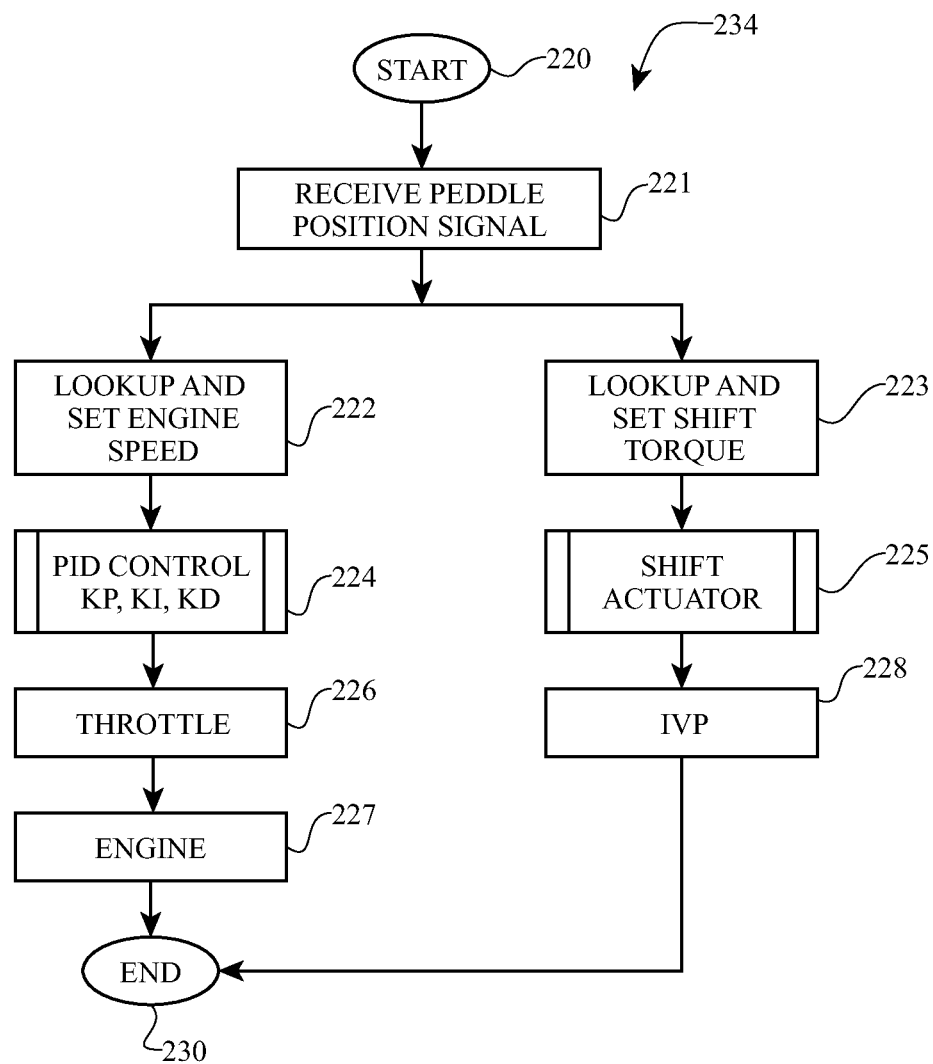
FIG. 11 is a block diagram of a control algorithm for operating a launch condition for the IVT of FIG. 1.

Referring now to FIG. 11, in one embodiment the operating process 234 can begin at a state 220 and proceed to a state 221 where a signal indicative of an accelerator pedal position is received. The process 234 proceeds to a state 222 where an engine speed is set. The process 200 can proceed in parallel to a state 224 where a desired shift torque is determined. In one embodiment, the states 222, 224 include look-up tables that relate the pedal position to engine speed and shift torque respectively. In some cases, there is a pedal position threshold below which the engine speed is set to idle speed. Upon surpassing the pedal position threshold the engine speed is set to a non-idle condition. In one embodiment, the process 234 includes a state 226 where an engine throttle is controlled to achieve the desired engine speed determined in the states 222, 224. The process 234 proceeds to a state 224 where a PID control process 224 can be executed to set the engine speed to the target value. Upon execution of the process 224, the process 234 proceeds to a state 226 where a throttle position is controlled based on the result of the process 224. The process 234 proceeds from the state 223 to a state 225 where a shift actuator process is executed. In some embodiments, a gain on the pedal position can specify the shift torque to be applied. The shift actuator process can be configured to communicate with appropriate transmission hardware to apply a torque to the transmission to thereby control transmission ratio. Application of said torque to the transmission can occur at a state 228. The process 234 proceeds to an end state 230. During operation of the process 200, torque delivered to the wheels of a vehicle is substantially controlled by the control of the transmission ratio while the overall power is controlled via engine speed control.

Figures 12, 13:
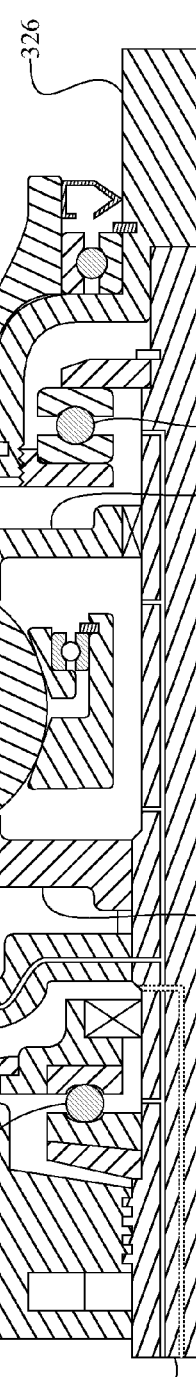
FIG. 12 is a table depicting operating mode and clutch engagement to certain components of the IVT of FIG. 1.
FIG. 13 is a cross-sectional view of ball planetary infinitely variable transmission (IVT) having a power path control system.

Referring now to FIG. 12, a table 250 illustrates engagement of a drive clutch assembly and a one-way clutch assembly to the corresponding operating mode. For example, the first column of the table lists clutch elements C1, C2, C3, and C4. The clutch elements C1 and C2 represent elements of the drive clutch, such as the engine drive clutch assembly 4. The clutch elements C3 and C4 represent the elements of the one-way clutch assembly, such as the one-way clutch assembly 6. The columns of table 250 labeled "IVP Mode" and "CVP Mode" are populated with "X" and "O". The entry of "X" indicates engagement; the entry "O" indicates an open or disengaged condition. The last column of Table 250 is labeled "Coupling Component"

and indicates a carrier member or a ring. For example, during IVP Mode operation, the clutch elements C1 and C3 are engaged to a carrier member and ring of the transmission, respectively, while the clutch elements C2 and C4 are open or disengaged. During CVP Mode operation, the clutch elements C2 and C4 are engaged to a ring and a carrier member, respectively, while the clutch elements C1 and C3 are open or disengaged. During operation of the transmission, whether in IVP or CVP mode, the one-way clutch elements C3, C4 may always be active or engaged. In either mode, clutch elements C3 and C4 are active at least during the mode transition processes, such as from states 132 to 140. The one-way clutch elements are further locked in final step of the transition, for example at state 138. The locking of state 138 is when the "X" is applied to lock the one-way clutch element C4 as shown in Table 250, thus completing the transition to CVP Mode.

Figure 14:
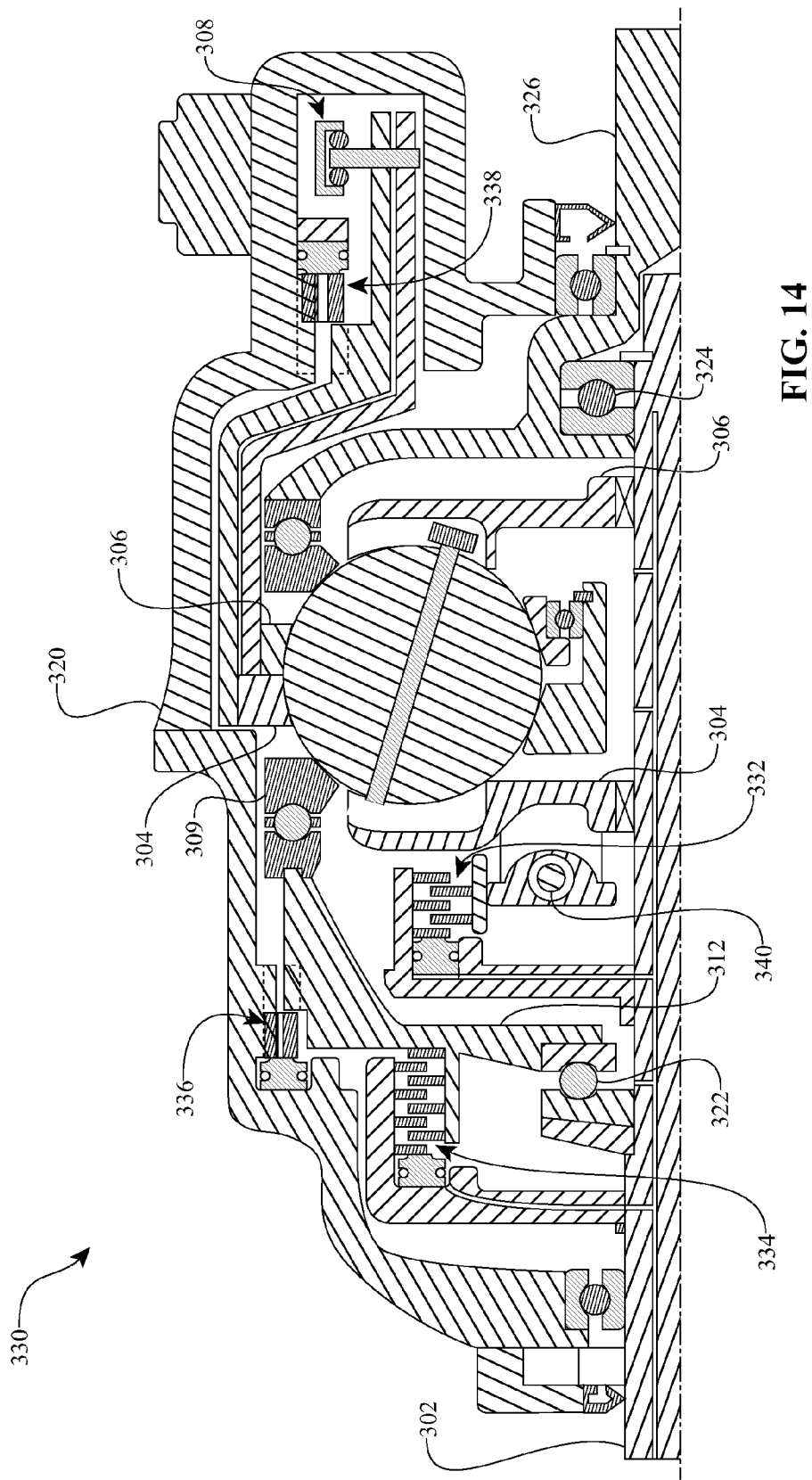
FIG. 14 is a cross-sectional view of another ball planetary infinitely variable transmission (IVT) having a power path control system.
Figure 15:
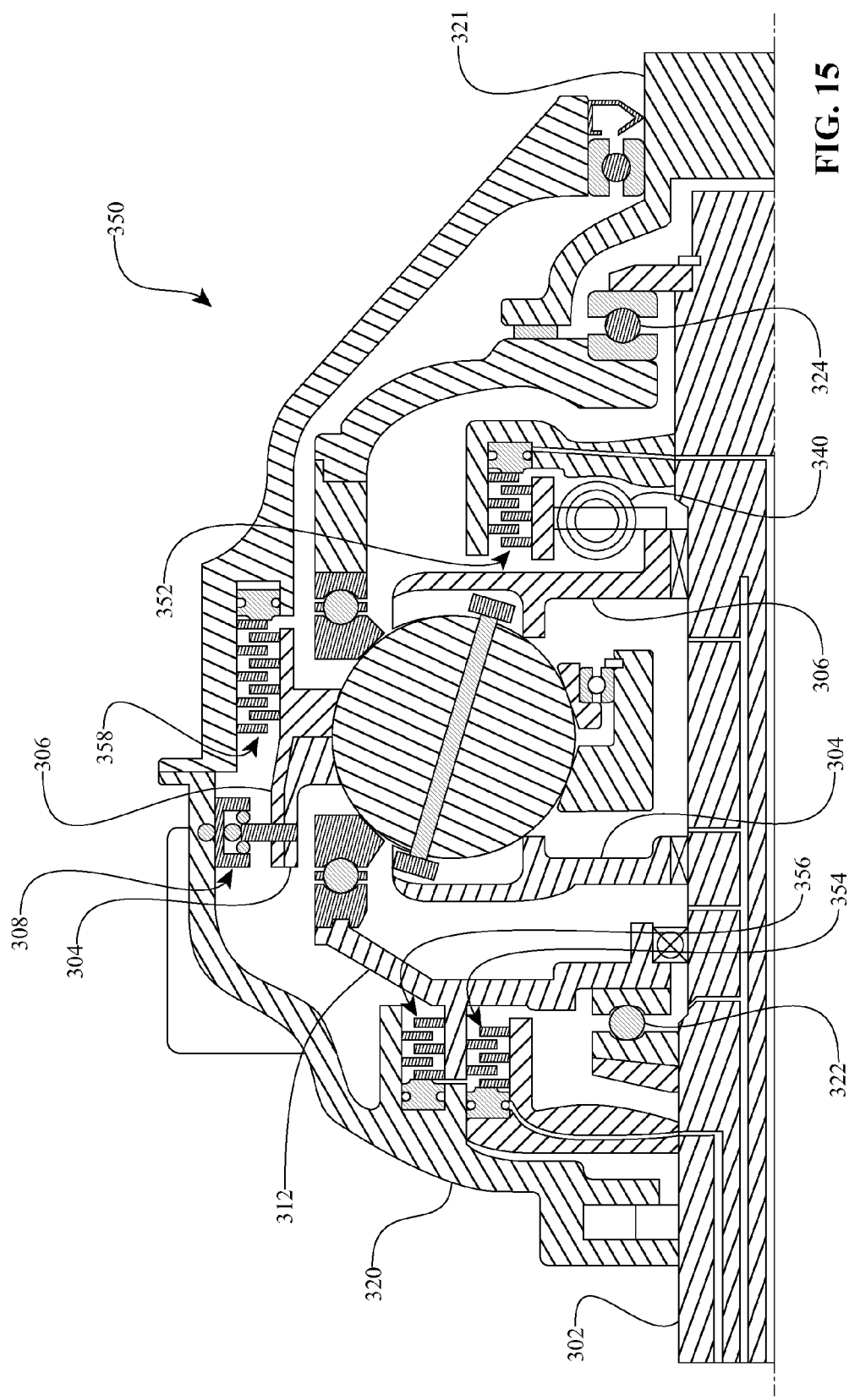
FIG. 15 is a cross-section view of yet another ball planetary infinitely variable transmission (IVT) having a power path control system.
Figure 16:
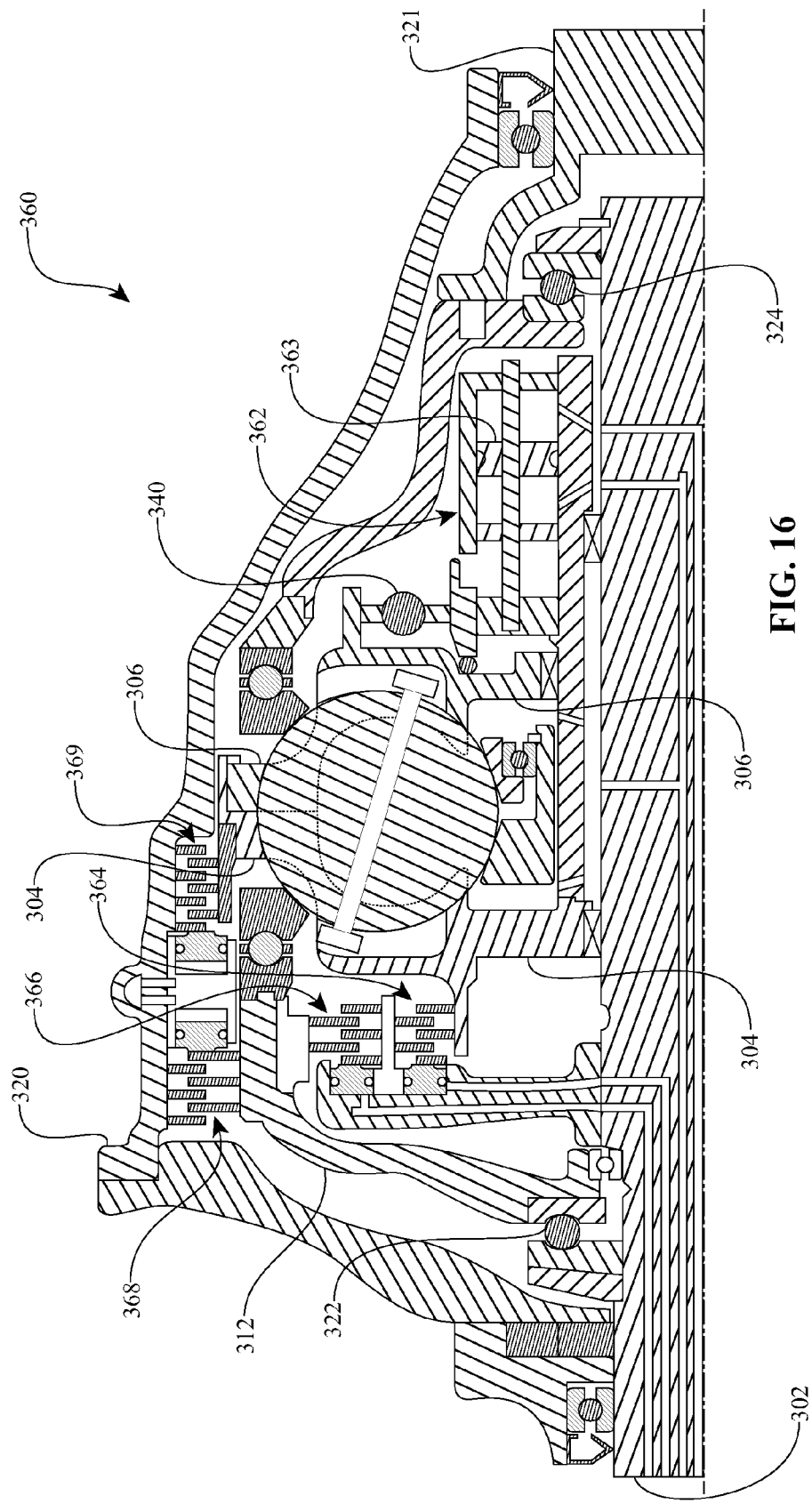
FIG. 16 is a cross-sectional view of a ball planetary infinitely variable transmission (IVT) having a power path control system and a hydraulic shift system.
Figure 17:
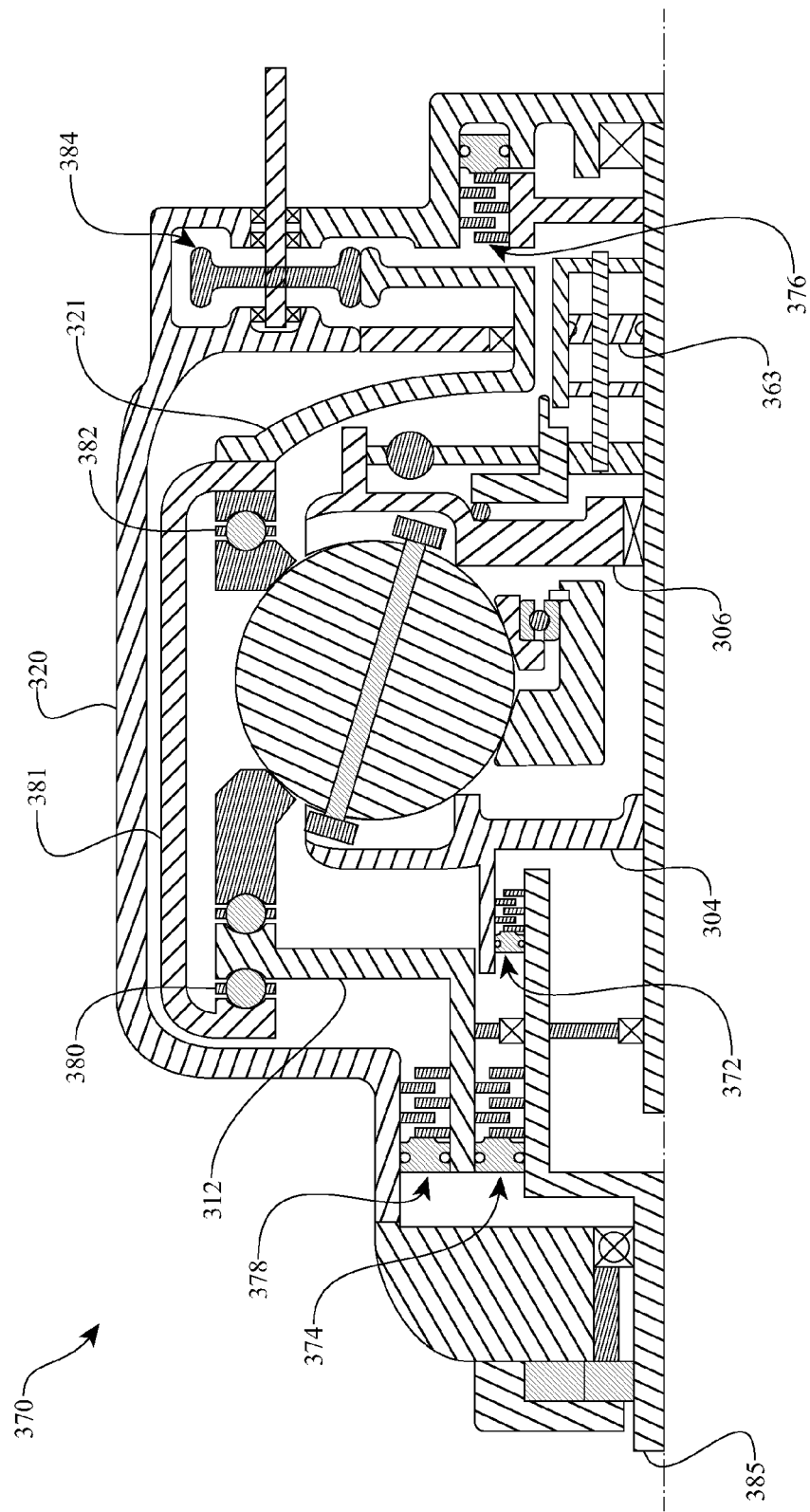
FIG. 17 is a cross-section view of another ball planetary infinitely variable transmission (IVT) having a power path control system and a hydraulic shift system.

Turning now to FIGS. 13-17, embodiments of infinitely variable transmissions having a power path control system will be described. It should be noted that form and shape of particular components of the transmissions disclosed here can be selected by a designer to achieve a desired function and fulfill any number of design constraints encountered. The embodiments described in FIGS. 13-17 are illustrative examples of transmission architectures. In some embodiments, the one way clutches provide a specific connection between the traction ring and carrier members to ground. In their respective cases they prevent reverse rotation relative to ground, for example, a transmission housing. Reverse rotation is described as opposite to that of the drive shaft, say from engine or motor. The one-way action is always active. Alternatively, reverse rotation could be prevented through active control of a traditional wet or dry clutch (as illustrated in FIGS. 15-17). The one-way clutch provides an instantaneous mechanical constraint against reversal during a mode shift. This simplifies controls implementation. Once the operational mode is established then forward rotation must be additionally constrained at the one-way clutch, thus fully constraining both rotational directions. This is necessary for the drive to carry torque back driving loads and is implemented in "command lock one way" control blocks of FIGS. 4-9. One embodiment is to engage an intermediate slider, or dog, between the housing and the engaged traction ring or carrier member. During mode change neither intermediate slider is engaged. The last step of any mode change is "command lock" of the respective one way.

Referring specifically to FIG. 13 now, in one embodiment a transmission 300 is provided with a main drive shaft 302 arranged along a longitudinal axis. The transmission 300 includes first and second carrier members 304, 306. The main drive shaft 302 is adapted to receive a rotational power input. The second carrier member 306 is operably coupled to a shift actuator assembly 308. The shift actuator assembly 308 is configured to provide relative rotation between the first and second carrier members 304, 306 to thereby change the transmission ratio of the transmission 300. The transmission 300 includes first and second traction rings 309, 310. The first traction ring 310 is operably coupled to a ring driver 312. In one embodiment, the main drive shaft 302 is coupled to a drive clutch assembly 314. The drive clutch assembly 314 includes a ring coupling element 314A and a carrier coupling element 314B. The ring coupling element 314A is configured to selectively couple to the ring driver 312. The carrier coupling element 314B is configured to selectively couple to the first carrier member 304. In some embodiments, the drive clutch assembly 314 can be a hydraulic clutch. In other embodiments, the drive clutch assembly 314 can be a dog style clutch that is adapted to engage at a zero speed condition. In yet other embodiments, the drive clutch assembly 314 can be a one-way dog style clutch.

Still referring to FIG. 13, the transmission 300 includes a one way clutch assembly 316. The one way clutch assembly 316 has clutch elements 316A, 316B coupled to the ring driver 312 and the first carrier member 304, respectively. The one-way clutch assembly 316 is coupled to a ground member, such as a transmission housing 320. In one embodiment, the one-way clutch assembly 316 and the drive clutch assembly 314 are located on the input side of the transmission 300. The shift actuator assembly 308 can be located on the output side of the transmission 300. The transmission 300 includes first and second axial thrust bearings 322, 324. The first axial thrust bearing 322 is coupled to the main drive shaft 302 and the ring driver 312. The second axial thrust bearing 324 is coupled to the main drive shaft 302 and an output shaft 326.

Turning now to FIG. 14, in one embodiment a transmission 330 can be configured to have a power path control system that includes first and second drive clutches 332, 334 and first and second one-way clutches 336, 338. For simplicity, only the differences between the transmission 330 and the transmission 300 will be described. It should be noted that form and shape of particular components of the transmissions disclosed here can be selected by a designer to achieve a desired function and fulfill any number of design constraints encountered. In one embodiment, the transmission 330 is provided with a spring 340 coupled to the first carrier member 304. The spring 340 is adapted to position the first carrier member 304 in a pre-determined position to achieve a desired transmission ratio for an off condition. In one embodiment, the first and second drive clutches 332, 334 and the first one-way clutch 336 is located on the input side of the transmission 330. The first one-way clutch 336 is selectively coupled to the ring driver 312 and the housing 320. The second one-way clutch 338 is located on the output side of the transmission. The second one-way clutch 338 is selectively coupled to the first carrier member 304 and the housing 320. In some embodiments, the shift actuator assembly 308 is located on the output side of the transmission 330.

Referring now to FIG. 15, a transmission 350 can be configured to have a power path control system that includes first and second drive clutches 352, 354 and first and second one-way clutches 356, 358. For simplicity, only the differences between the transmission 350 and the transmission 300 will be described. In one embodiment, the transmission 350 is provided with first and second drive clutches 352, 354. The first drive clutch 352 can be located on the output side of the transmission 350. The first drive clutch 352 is selectively coupled to the second carrier member 306 and the main shaft 302. The second drive clutch 354 is located on the input side of the transmission 350. The second drive clutch 354 is selectively coupled to the ring driver 312. In one embodiment, the transmission 350 has first and second one-way clutches 356, 358. The first one-way clutch 356 is located on the input side of the transmission and can be integrated with the second drive clutch 354. The first one-way clutch is selectively coupled to the ring driver 312 and the housing 320. The second one-way clutch 358 is selectively coupled to the second carrier member 306 and the housing 320.

Turning now to FIG. 16, in one embodiment, a transmission 360 can be configured to have a hydraulic shifting mechanism 362 provided with an axially translating hydraulic piston 363 operably coupled to the second carrier member 306. The transmission 360 can be provided with a power path control system that includes first and second drive clutches 364, 366 and first and second one-way clutches 368, 369. In one embodiment, the first drive clutch 364 is selectively coupled to the first carrier member 304 and the main drive shaft 302. The second drive clutch 366 is selectively coupled to the ring driver 312 and the main shaft 302. The first one-way clutch 368 is selectively coupled to the ring driver 312 and the housing 320. The first one-way clutch 369 is selectively coupled to the first carrier member 304 and the housing 320.

Referring now to FIG. 17, in one embodiment a transmission 370 can be provided with a power path control system that includes first and second drive clutches 372, 374 and first and second one-way clutches 376, 378. In one embodiment, the transmission 370 is provided with a thrust bearing 380 coupled to the ring driver 312 and a coupling 381. The coupling 381 is operably coupled to an output load cam 382 and the output shaft 312. The thrust bearing 380 is configured to react axial forces generated during operation of the transmission 370. In some embodiments, the output shaft 312 is coupled to output gearing 384. In one embodiment, the first drive clutch 372 is configured to selectively couple an input drive shaft 385 to the first carrier member 304. The second drive clutch 374 is adapted to selectively couple the input drive shaft 385 to the ring driver 312. The first one-way clutch 376 is configured to selectively couple the second carrier member 306 to the housing 320. The second one-way clutch 378 is adapted to selectively couple the ring driver 312 to the housing 320.

Passing now to FIGS. 18-22, in one embodiment a carrier assembly 400 can be used with transmissions disclosed herein. The carrier assembly 400 can be operably coupled to a shift actuator 402. The shift actuator 402 can be a motor or any device that can apply a rotational torque to components of the carrier assembly 400. In one embodiment, the shift actuator 402 is further provided with a sliding coupling 401. The sliding coupling 401 can be selectively positioned to engage certain components of the carrier assembly 400. The carrier assembly 400 is provided with a translating assembly 404. The translating assembly 404 includes a translating member 406 and any device configured to selectively position the translating member 406 with respect to the longitudinal axis. The carrier assembly 400 includes a number of carrier plates 408, 409, 410, 411. The carrier plates 408, 409, 410, 411 are adapted to support a traction planet assembly 412. The traction planet assembly 412 can include an axle 413 coupled to a number of rollers 414. The rollers 414 can couple to the carrier plates 408, 409, 410, 411. In other embodiments, the axle 413 can directly couple to the carrier plates 408, 409, 410, 411. The carrier plates 408, 409 are arranged on a first end of the axle 413 and the carrier plates 410, 411 are arranged on a second end of the axle 413. The carrier plates 408, 409 are provided with a number of circumferential splines 415 that are adapted to receive the translating member 406. The carrier plates 410, 411 are provided with a number of circumferential splines 419 that are adapted to receive the sliding coupling 401.

During operation of the transmission, control of the transmission ratio is achieved by relative rotation of the carrier members with respect to each other, for example rotation of carrier member 409 with respect to the carrier member 410. Depending on transmission operating mode, the transmission will see the traction ring in a forward or reverse direction with respect to the carrier members. The translating assembly 404 and the shift actuator 402 can selectively engage a pair of carrier members. For example, carrier members 409, 410 are engaged when the transmission is rotating in a forward rotation, while carrier members 408, 411 are engaged when the transmission is rotating in a reverse rotation. Carrier members 408, 409 switch between being free and attached to the shift actuator 402. Carrier members 411, 410 are switched between being free and controlled by the shift actuator 402. In a mode change between CVT and IVT, the switch between carrier members occurs when the rotations for the ring and the carrier members are synchronous. The carrier member comes to a stop as the ring driver speeds up to drive shaft speed when transitioning from IVP to CVP. The switch between carrier members occurs when the ring driver and the carrier members have the same speed. In some embodiments, the carrier member 410 is a radial guide slot 417 (FIG. 20) and the carrier members 408, 409 are selectively engaged for reverse and forward direction, respectively.

Turning specifically now to FIG. 20, in one embodiment the carrier plate 410 is a substantially bowl-shaped body having a central bore 416. The bowl-shaped body can be provided with a number of guide slots 417 arranged angularly about the central bore 416. The guide slots 417 are aligned with a radial construction line 418 when viewed in the plane of the page of FIG. 20. The guide slots 417 are adapted to receive one end of the planet axle 416. The bowl-shaped body is provided with a flange 419 formed about the outer periphery. The flange 419 can be adapted to attach to the shift actuator 402.

Referring now to FIG. 21, in one embodiment the carrier plate 408 is a substantially bowl-shaped body having a central bore 420. The bowl-shaped body can be provided with a number of guide slots 422 arranged angularly about the central bore 420. Each guide slot 422 is sized to accommodate the coupling of the carrier plate 408 to the axle 416. The guide slots 422 are angularly offset from the radial construction line 424 when viewed in the plane of the page of FIG. 21. The angular offset can be approximated by an angle 425. The angle 425 is formed between the radial construction line 424 and a construction line 426. The construction line 426 substantially bisects the guide slot 422 when viewed in the plane of the page of FIG. 21. In some embodiments, the angle 425 is between 3 degrees and 45 degrees. The values of the angle 425 are provided as an illustrative example, and the angle 425 can be varied in any manner a designer desires. In some embodiments, the angle 425 can be any angle in the range of 10 to 25 degrees including any angle in between or fractions thereof. For example, the angle can be 10, 11, 12, 13, 14, 15, 16, 17, 18, 19, 20, 21, 22, 23, 24, 25, or any portion thereof. In other embodiments, the angle 425 can be 20 degrees. In one embodiment, the guide slots 422 can be arranged so that the construction line 426 is radially offset from a construction line 427 by a distance 428. The construction line 428 is parallel to the construction line 427 and intersects the center of the bowl-shaped body.

Referring to FIG. 22, in one embodiment the carrier plate 409 is a substantially bowl-shaped body having a central bore 430. The bowl-shaped body can be provided with a number of guide slots 432 arranged angularly about the central bore 430. Each guide slot 432 is sized to accommodate the coupling of the carrier plate 408 to the axle 416. The guide slots 432 are angularly offset from the radial construction line 434 when viewed in the plane of the page of FIG. 22. The angular offset can be approximated by an angle 435. The angle 435 is formed between the radial construction line 434 and a construction line 436. The construction line 436 substantially bisects the guide slot 432 when viewed in the plane of the page of FIG. 22. In some embodiments, the angle 435 is between 3 degrees and 45 degrees. The values of the angle 435 are provided as an illustrative example, and the angle 435 can be varied in any manner a designer desires. In some embodiments, the angle 435 can be any angle in the range of (−)10 to (−)25 degrees including any angle in between or fractions thereof. The "(−)" indicates a negative value with respect to construction line 434 in contrast to the positive values for the angle 425 with respect to the construction line 424. For example, the angle can be (−)10, (−)11, (−)12, (−)13, (−)14, (−)15, (−)16, (−)17, (−)18, (−)19, (−)20, (−)21, (−)22, (−)23, (−)24, (−)25, or any portion thereof. In other embodiments, the angle 435 can be 20 degrees. In one embodiment, the guide slots 432 can be arranged so that the construction line 436 is radially offset from a construction line 437 by a distance 438. The construction line 438 is parallel to the construction line 437 and intersects the center of the bowl-shaped body.

It should be noted that the carrier plate 411 can be substantially the same as the carrier plate 408 if the carrier plate 410 is configured to have angularly offset slots 432 as shown in FIG. 22. When the carrier plate 410 is formed with radial slots 417, the carrier plate 411 is not needed in the carrier assembly 400.

Those of skill will recognize that the various illustrative logical blocks, modules, circuits, and algorithm steps described in connection with the embodiments disclosed herein, including with reference to the transmission control system described herein, for example, may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. For example, various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Software associated with such modules may reside in RAM memory, flash memory, ROM memory, EPROM memory, EEPROM memory, registers, a hard disk, a removable disk, a CD-ROM, or any other suitable form of storage medium known in the art. An exemplary storage medium is coupled to the processor such the processor can read information from, and write information to, the storage medium. In the alternative, the storage medium may be integral to the processor. The processor and the storage medium may reside in an ASIC. For example, in one embodiment, a controller for use of control of the IVT 1 comprises a processor (not shown).

The foregoing description details certain embodiments of the disclosure. It will be appreciated, however, that no matter how detailed the foregoing appears in text, the embodiments can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the disclosure with which that terminology is associated.

What we claim is:

1. A transmission comprising:
    a first disc mounted coaxially about a longitudinal axis of the transmission;
    a plurality of tiltable balls placed angularly about the longitudinal axis and in contact with the first disc;
    a second disc mounted coaxially about the longitudinal axis of the transmission and in contact with the plurality of tiltable balls;
    an idler placed radially inward of, and in contact with, the plurality of tiltable balls;
    a cage operably coupled to the plurality of balls;
    a first clutch assembly operably coupled to the cage and the first disc;
    a second clutch assembly operably coupled to the cage and the first disc;
    wherein at least two of the first disc, second disc, idler, and cage are adapted to receive a power input; and
    wherein at least one of the first disc, second disc, idler and cage is adapted to provide a power output.

2. The transmission of claim 1, wherein the idler is adapted to rotate freely without transferring power.

3. The transmission of claim 1, wherein the first disc and the cage are adapted to receive a power input.

4. The transmission of claim 1, wherein the first clutch assembly is operably coupled to a power source, wherein the second clutch is operably coupled to a ground member, and wherein the first and second clutch can be actuated to provide an input power to the transmission.

5. The transmission of claim 1, wherein the first clutch assembly comprises a hydraulic clutch.

6. The transmission of claim 1, wherein the second clutch assembly comprises a one-way clutch.

7. The system of claim 1, further comprising a controller configured to execute a set of instructions for performing:
    receiving a plurality of signals;
    determining a target operating mode;
    determining a command signal for the first clutch assembly;
    determining a command signal for the second clutch assembly; and
    selectively engaging the first clutch assembly to the first traction ring and the cage based at least in part on the command signal for the first clutch assembly.

8. The system of claim 7, the controller further configured to selectively engage the second clutch assembly to the first traction ring and the cage based at least in part on the command signal for the second clutch assembly.

9. The system of claim 7, wherein determining a command signal for the first clutch assembly comprises the step of comparing the target operating mode to a user command signal.

10. The system of claim 9, wherein the user command signal comprises a throttle position signal.

11. The system of claim 9, wherein the user command signal comprises a control lever position signal or a PRNDL position signal.

12. The system of claim 7, wherein selectively engaging the first clutch assembly comprises the step of unlocking the first clutch.

13. The system of claim 7, wherein selectively engaging the second clutch assembly comprises the step of releasing the first traction ring.

14. The system of claim 7, wherein selectively engaging the second clutch assembly comprises the step of releasing the cage.

15. The system of claim 1, further comprising a controller configured to execute a set of instructions for performing:
receiving at least one signal indicative of a current operating mode of the transmission;
receiving a user command signal;
determining a target operating mode of the transmission based at least in part on the user command signal;
comparing the target operating mode to the current operating mode;
commanding the first clutch assembly to selectively unlock the first traction ring and/or the cage; and
commanding the second clutch assembly to selectively engage the first traction ring and/or the cage.

16. The system of claim 15, wherein commanding the first clutch assembly comprises at least one of unlocking the first traction ring, locking the cage, engaging the cage, locking the first traction ring, engaging the first traction ring, and unlocking the cage.

17. The system of claim 15, wherein commanding the second clutch assembly comprises at least one of engaging the first traction ring, releasing the cage, engaging the cage, and releasing the first traction ring.

* * * * *